US012437486B2

(12) United States Patent
Xiong

(10) Patent No.: US 12,437,486 B2
(45) Date of Patent: Oct. 7, 2025

(54) GENERATION AND RENDERING OF EXTENDED-VIEW GEOMETRIES IN VIDEO SEE-THROUGH (VST) AUGMENTED REALITY (AR) SYSTEMS

(71) Applicant: Samsung Electronics Co., Ltd., Suwon-si (KR)

(72) Inventor: Yingen Xiong, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 18/327,605

(22) Filed: Jun. 1, 2023

(65) Prior Publication Data

US 2024/0257475 A1    Aug. 1, 2024

Related U.S. Application Data

(60) Provisional application No. 63/442,015, filed on Jan. 30, 2023.

(51) Int. Cl.
*G06T 19/00* (2011.01)
*G06T 3/40* (2024.01)
(Continued)

(52) U.S. Cl.
CPC ............. *G06T 19/006* (2013.01); *G06T 3/40* (2013.01); *G06T 5/20* (2013.01); *G06V 10/44* (2022.01)

(58) Field of Classification Search
CPC ........... G06T 19/006; G06T 3/40; G06T 5/20; G06T 15/20; G06T 2207/10021;
(Continued)

(56) References Cited

U.S. PATENT DOCUMENTS 11,037,359 B1    6/2021   Bleyer et al.
11,158,108 B2   10/2021   Bleyer et al.
(Continued)

FOREIGN PATENT DOCUMENTS

CN           113179396 A     7/2021
KR   10-2012-0119774 A    10/2012
(Continued)

OTHER PUBLICATIONS

Takeo Kanade, Atsushi Yoshida, Kazuo Oda, Hiroshi Kano and Masaya Tanaka, A Stereo Machine for Video-rate Dense Depth Mapping and Its New Applications, 1996, In Proceedings CVPR IEEE Computer Society Conference on Computer Vision and Pattern Recognition, pp. 196-202. (Year: 1996).*
(Continued)

*Primary Examiner* — Jeffery A Brier

(57) ABSTRACT

A method includes obtaining multiple see-through image frames of an environment around an augmented reality (AR) device using multiple imaging sensors of the AR device. The method also includes generating a depth map based on the see-through image frames and generating a three-dimensional (3D) representation of the environment based on the depth map. The method further includes projecting the 3D representation onto a curved surface, mapping points of the projected 3D representation to multiple virtual view images, and presenting the virtual view images on one or more displays of the AR device. Generating the depth map may include generating an initial depth map using a trained machine learning model and modifying the initial depth map to provide both spatial consistency and temporal consistency in order to generate a refined depth map. The curved surface may include a portion of a cylindrical, spherical, or conical surface.

20 Claims, 10 Drawing Sheets

(51) Int. Cl.
*G06T 5/20* (2006.01)
*G06V 10/44* (2022.01)

(58) Field of Classification Search
CPC .......... G06T 7/593; G06T 2207/20081; G06T 2207/20084; G06V 10/44
See application file for complete search history.

(56) References Cited

U.S. PATENT DOCUMENTS

| | | |
|---|---|---|
| 11,288,543 B1 | 3/2022 | Tovchigrechko |
| 11,693,242 B2 | 7/2023 | Fortin-Deschenes et al. |
| 11,703,323 B2 | 7/2023 | Hall et al. |
| 2013/0176405 A1 | 7/2013 | Jeong et al. |
| 2015/0249815 A1* | 9/2015 | Sandrew ............ G06T 17/00 348/47 |
| 2018/0278916 A1* | 9/2018 | Kim .................. G03B 37/04 |
| 2019/0332942 A1 | 10/2019 | Wang et al. |
| 2021/0125414 A1* | 4/2021 | Berkebile ............ G06F 3/017 |
| 2021/0150747 A1 | 5/2021 | Liu et al. |
| 2021/0400249 A1 | 12/2021 | Edmonds et al. |
| 2022/0060677 A1 | 2/2022 | Park et al. |
| 2022/0148207 A1 | 5/2022 | Varekamp et al. |
| 2022/0254121 A1 | 8/2022 | Xu et al. |

FOREIGN PATENT DOCUMENTS

| | | |
|---|---|---|
| KR | 10-2021-0058683 A | 5/2021 |
| WO | 2018110822 A1 | 6/2018 |

OTHER PUBLICATIONS

Masayuki Kanbara, Takashi Okuma, Haruo Takemura and Naokazu Yokoya, Real-time Composition of Stereo Images for Video See-through Augmented Reality, 1999, In Proceedings IEEE International Conference on Multimedia Computing and Systems, vol. 1, pp. 213-219. (Year: 1999).*

Masayuki Kanbara, Takashi Okuma, Haruo Takemura and Naokazu Yokoya, A Stereoscopic Video See-through Augmented Reality System Based on Real-time Vision-based Registration, 2000, In Proceedings IEEE Virtual Reality 2000, pp. 255-262. (Year: 2000).*

International Search Report and Written Opinion of the International Searching Authority dated Feb. 19, 2024 in connection with International Patent Application No. PCT/KR2023/018564, 9 pages.

* cited by examiner

GENERATION AND RENDERING OF EXTENDED-VIEW GEOMETRIES IN VIDEO SEE-THROUGH (VST) AUGMENTED REALITY (AR) SYSTEMS

CROSS-REFERENCE TO RELATED APPLICATION AND PRIORITY CLAIM

This application claims priority under 35 U.S.C. § 119(e) to U.S. Provisional Patent Application No. 63/442,015 filed on Jan. 30, 2023, which is hereby incorporated by reference in its entirety.

TECHNICAL FIELD

This disclosure relates generally to augmented reality (AR) systems and processes. More specifically, this disclosure relates to the generation and rendering of extended-view geometries in video see-through (VST) AR systems.

BACKGROUND

Augmented reality (AR) systems are becoming more and more popular over time, and numerous applications have been and are being developed for AR systems. An AR system typically enhances a user's view of his or her current environment by overlaying digital content (such as information or virtual objects) over the user's view of the current environment. For example, an AR system can often seamlessly blend virtual objects generated by computer graphics with real-world scenes.

SUMMARY

This disclosure relates to the generation and rendering of extended-view geometries in video see-through (VST) augmented reality (AR) systems.

In a first embodiment, a method includes obtaining multiple see-through image frames of an environment around an AR device using multiple imaging sensors of the AR device. The method also includes generating a depth map based on the see-through image frames and generating a three-dimensional (3D) representation of the environment based on the depth map. The method further includes projecting the 3D representation onto a curved surface, mapping points of the projected 3D representation to multiple virtual view images, and presenting the virtual view images on one or more displays of the AR device.

In a second embodiment, an AR device includes imaging sensors configured to capture multiple see-through image frames of an environment around the AR device and one or more displays. The AR device also includes at least one processing device configured to generate a depth map based on the see-through image frames, generate a 3D representation of the environment based on the depth map, project the 3D representation onto a curved surface, map points of the projected 3D representation to multiple virtual view images, and initiate presentation of the virtual view images on the one or more displays.

In a third embodiment, a non-transitory machine readable medium contains instructions that when executed cause at least one processor of an AR device to obtain multiple see-through image frames of an environment around the AR device using multiple imaging sensors of the AR device. The non-transitory machine readable medium also contains instructions that when executed cause the at least one processor to generate a depth map based on the see-through image frames and generate a 3D representation of the environment based on the depth map. The non-transitory machine readable medium further contains instructions that when executed cause the at least one processor to project the 3D representation onto a curved surface, map points of the projected 3D representation to multiple virtual view images, and initiate presentation of the virtual view images on one or more displays of the AR device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
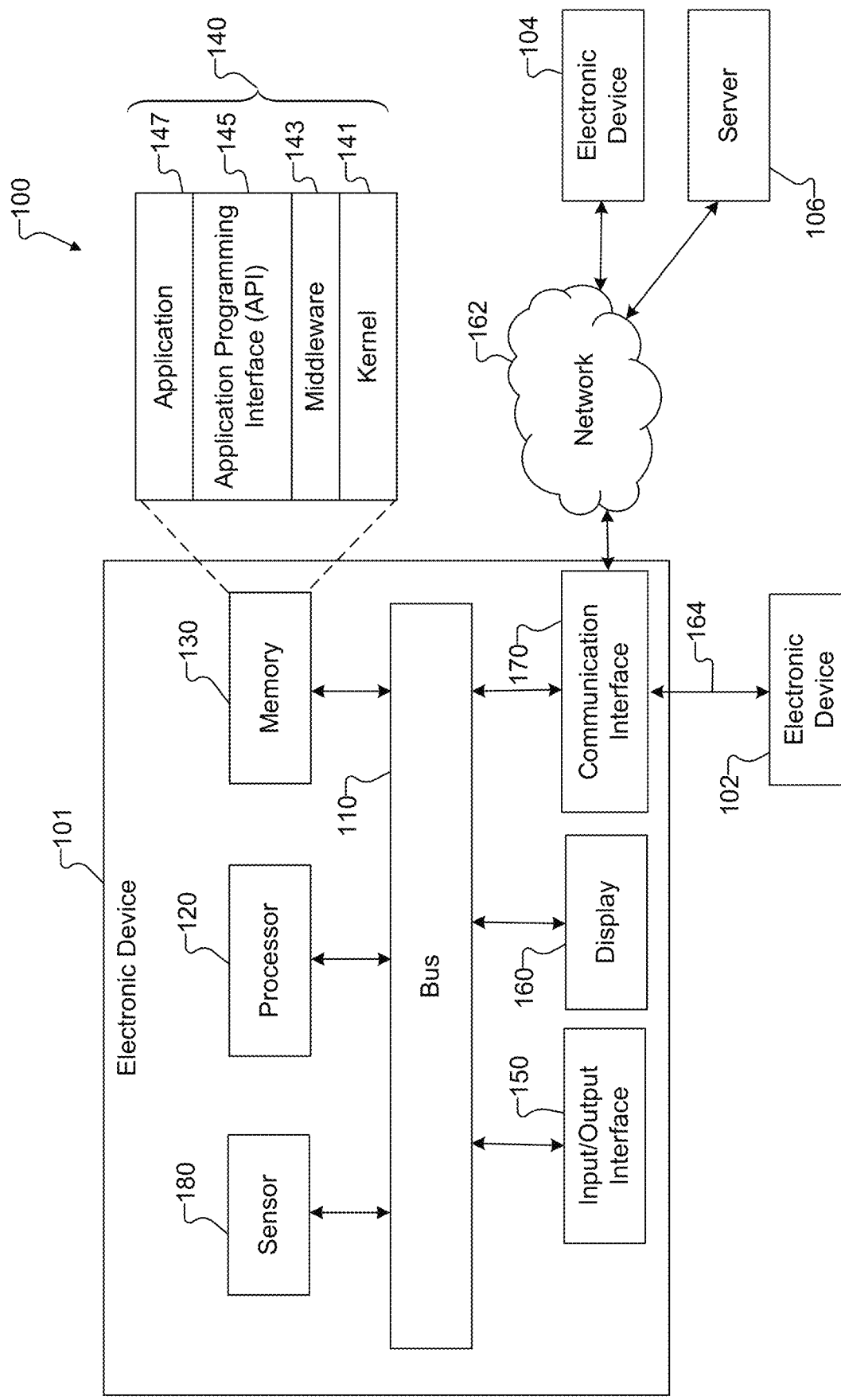
FIG. 1 illustrates an example network configuration including an electronic device in accordance with this disclosure.

FIGS. 1 through 13, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, augmented reality (AR) systems are becoming more and more popular over time, and numerous applications have been and are being developed for AR systems. An AR system typically enhances a user's view of his or her current environment by overlaying digital content (such as information or virtual objects) over the user's view of the current environment. For example, an AR system can often seamlessly blend virtual objects generated by computer graphics with real-world scenes.

An optical see-through (OST) AR system generally allows a user to view his or her environment directly, where light from the user's environment is passed to the user's eyes. Digital content can be superimposed onto the user's view of the environment using one or more panels or other structures through which the light from the user's environment passes. In contrast, a video see-through (VST) AR system (also called a "passthrough" AR system) generally uses see-through cameras to capture images of a user's environment. Digital content can be blended with the captured images, and the mixed images are displayed to the user for viewing. Both approaches can provide immense contextual augmented reality experiences for users.

One potential advantage of VST AR systems over OST AR systems is that VST AR systems can provide wider fields of view to users compared to OST AR systems. This is because the VST AR systems use the see-through cameras to capture three-dimensional (3D) environments or scenes around the VST AR systems and then visually reproduce the 3D scenes to users. The field of view as seen by a user of a VST AR system is typically based on the fields of view of the see-through cameras and any associated see-through lenses in the VST AR system. Unfortunately, the generation and rendering of images by a VST AR system can be highly processor-intensive, and it can be extremely difficult to generate and render suitable images for viewing by a user of a VST AR system. Among other reasons, latency in the generation and rendering of the images by the VST AR systems can be noticed immediately by the users of the VST AR systems, which can lead to poor user experiences.

This disclosure provides various techniques for generating and rendering extended-view geometries in VST AR systems. As described in more detail below, multiple see-through image frames of an environment around an AR device are obtained using multiple imaging sensors of the AR device. For example, one or more left see-through images and one or more right see-through images may be obtained using multiple see-through cameras. A depth map is generated based on the see-through image frames, and the depth map can be generated in a manner so as to achieve both spatial consistency and temporal consistency. Spatial consistency can refer to depth consistencies between different see-through image frames captured by different imaging sensors at a common time, and temporal consistency can refer to depth consistencies between different see-through image frames captured by a common imaging sensor at different times (such as in a sequence of image frames). A 3D representation of the environment is generated based on the depth map, and the 3D representation is projected onto a curved surface. The curved surface represents a surface that provides an extended or enhanced field of view, such as a portion of a cylindrical, spherical, or conical surface. Points of the projected 3D representation are mapped to multiple virtual view images, and the virtual view images are rendered and presented on one or more displays of the AR device. For instance, the virtual view images may include one or more left rendered images and one or more right rendered images that are presented to a user via the display(s) of the AR device.

In this way, the described techniques provide efficient mechanisms for generating and rendering geometries of 3D scenes that are captured using see-through cameras. The generated and rendered geometries can provide wider-angle fields of view to a user of an AR device, which can be achieved through projection onto the curved surface. This allows for the use of efficient algorithms when reconstructing geometries and providing virtual views. Moreover, these techniques can be efficiently implemented within rendering pipelines to achieve low latencies, which can significantly increase user satisfaction. In addition, these techniques can be easily integrated into a graphics rendering pipeline and can be seamlessly combined with other rendering algorithms.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may perform one or more functions related to the generation and rendering of extended-view geometries for at least one AR application.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, generate and render extended-view geometries for at least one AR application. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or ide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 include one or more cameras or other imaging sensors, which may be used to capture images of scenes. The sensor(s) 180 can also include at least one depth sensor for estimating depths within scenes being imaged. The sensor(s) 180 can further include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include one or more position sensors, such as an inertial measurement unit that can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to the generation and rendering of extended-view geometries for at least one AR application.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
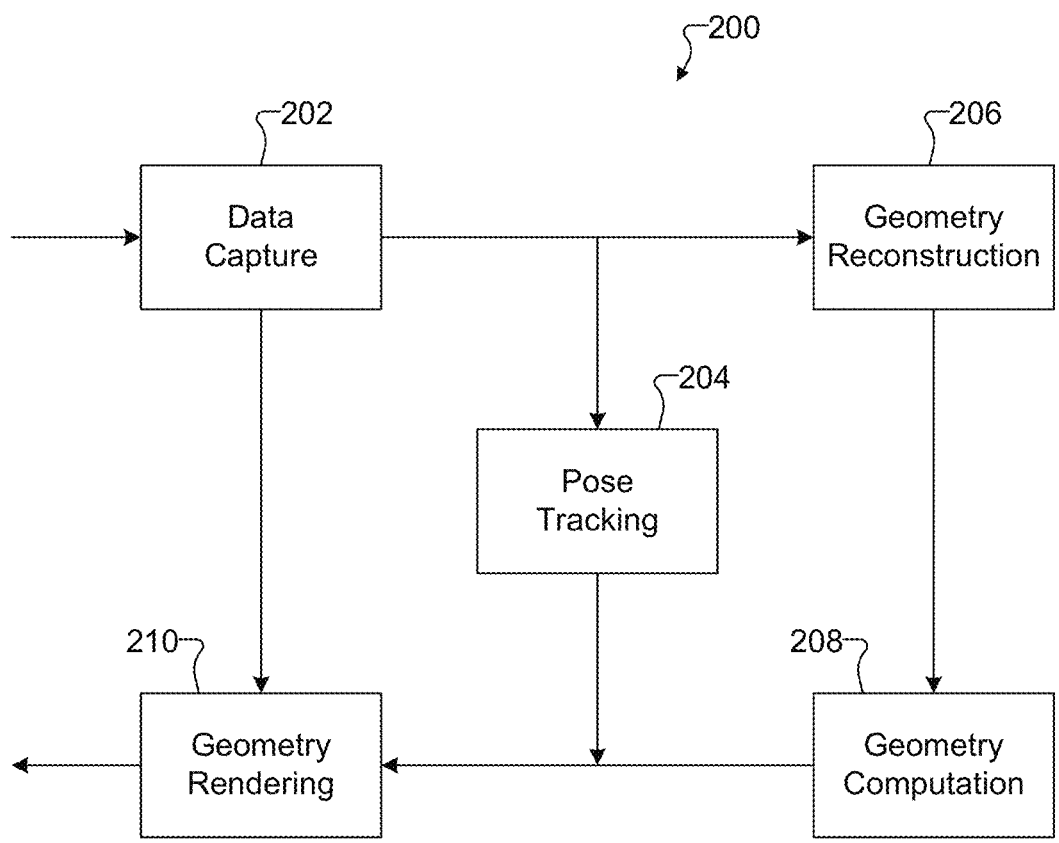
FIG. 2 illustrates an example architecture for generation and rendering of extended-view geometries in video see-through (VST) augmented reality (AR) systems in accordance with this disclosure.

FIG. 2 illustrates an example architecture 200 for generation and rendering of extended-view geometries in VST AR systems in accordance with this disclosure. For ease of explanation, the architecture 200 of FIG. 2 is described as being implemented using the electronic device 101 in the network configuration 100 of FIG. 1. However, the architecture 200 may be implemented using any other suitable device(s) and in any other suitable system(s).

As shown in FIG. 2, the architecture 200 generally includes data capture operations 202, pose tracking operations 204, geometry reconstruction operations 206, geometry computation operations 208, and geometry rendering operations 210. The data capture operations 202 represent one or more operations that are generally used to capture data processed or otherwise used by the architecture 200. For example, the data capture operations 202 may be performed to obtain sequences of image frames captured using imaging sensors 180 of the electronic device 101. As a particular example, the data capture operations 202 may be performed to obtain a sequence of image frames captured using a left see-through camera or other imaging sensor 180 of the electronic device 101 and to obtain a sequence of image frames captured using a right see-through camera or other imaging sensor 180 of the electronic device 101. The data capture operations 202 may also be used to obtain additional information for processing, such as information from one or more pose-tracking sensors, depth sensors, positional sensors (such as an IMU), or other sensors 180 of the electronic device 101.

Each image frame can have any suitable resolution and dimensions depending on the capabilities of the corresponding imaging sensor 180 that captured the image frame. In some cases, for instance, each image frame may have a 2K or 4K resolution. Each image frame can also include image data in any suitable format. In some embodiments, for example, each image frame includes RGB image data, which typically includes image data in three color channels (namely red, green, and blue color channels). However, each image frame may include image data having any other suitable resolution, form, or arrangement.

The pose tracking operations 204 represent one or more operations that are generally used to estimate poses of the imaging sensors 180 or the electronic device 101 during the capture of the image frames. For example, the pose tracking operations 204 may estimate poses of the imaging sensors 180 or the electronic device 101 based on the captured image frames and sensor data from an IMU or other positional sensor(s) 180. The pose tracking operations 204 may also operate to produce 3D sparse points, which can include a collection of 3D points identified in each of the image frames. In some embodiments, each pose of the imaging sensors 180 or the electronic device 101 may be expressed using six degrees of freedom (6DoF). Also, in some cases, the poses and the 3D sparse points may be obtained simultaneously, such as by applying simultaneous localization and mapping (SLAM) to the captured image frames and other obtained data. Here, simultaneous localization and mapping can be used to track imaging sensor poses and reconstruct 3D points of a scene captured in the image frames.

The geometry reconstruction operations 206 represent one or more operations that are generally used to produce depth maps containing estimated depths within the scene captured in the image frames, where these depths represent or are associated with an estimate of the overall geometry of the scene captured in the image frames. For example, the geometry reconstruction operations 206 can estimate depths within the scene based on the captured image frames and the estimated pose(s) of the imaging sensors 180 or the electronic device 101 during the image captures. The geometry reconstruction operations 206 may use any suitable technique to estimate depths within a scene captured in multiple image frames. In some embodiments, for example, the geometry reconstruction operations 206 may use a deep neural network (DNN), convolutional neural network (CNN), other neural network, or other machine learning model that has been trained to process image frames in order to generate depth maps. The depth maps generated by the geometry reconstruction operations 206 are said to represent initial depth maps since these depth maps are refined as described in more detail below.

The geometry computation operations 208 represent one or more operations that are generally used to process each initial depth map in order to clarify or filter depths contained in the initial depth map, thereby generating a refined depth map. The geometry computation operations 208 also represent one or more operations that are generally used to process each refined depth map in order to generate a 3D representation of the scene and to project the 3D representation onto a curved surface. For example, the geometry computation operations 208 can generate a refined depth map by modifying an initial depth map as needed in order to achieve spatial and temporal consistency. The geometry computation operations 208 can also process the refined depth map in order to produce a 3D point cloud or other 3D representation of the scene. Further, the geometry computation operations 208 can perform depth densification and verification in order to increase the resolution of the refined depth map and to verify depth values contained in the resulting higher-resolution depth map. In some cases, the higher-resolution depth map can have a resolution matching the resolution of the original image frames. In addition, the geometry computation operations 208 can project the geometry of the scene (as defined by the higher-resolution depth map) onto a curved surface. The curved surface represents a designed surface intended to provide a wider field of view, such as a portion of a cylindrical, spherical, or conical surface.

The geometry rendering operations 210 represent one or more operations that are generally used to project the geometry of the scene (as defined on the curved surface) to virtual camera positions in order to generate multiple virtual view images. The geometry rendering operations 210 also represent one or more operations that are generally used to render and present the virtual view images on one or more displays of an AR device, such as on one or more displays 160 of the electronic device 101. For example, the geometry rendering operations 210 can project the geometry of the scene (as defined on the curved surface) to left and right see-through image planes, which represent the views of the left and right imaging sensors 180, and colors or other texturing can be identified. The geometry rendering operations 210 can also project those views to left and right virtual camera positions, which represent the positions of virtual cameras positioned in front of left and right eyes of a user. In addition, the geometry rendering operations 210 can render the resulting views at the virtual camera positions into suitable virtual view images for presentation to the user via the display(s) of the AR device, such as via the one or more displays 160 of the electronic device 101. Note that multiple separate displays 160 (such as left and right displays separately viewable by the eyes of the user) or a single display 160 (such as one where left and right portions of the display are separately viewable by the eyes of the user) may be used to present the virtual view images.

Figure 3:
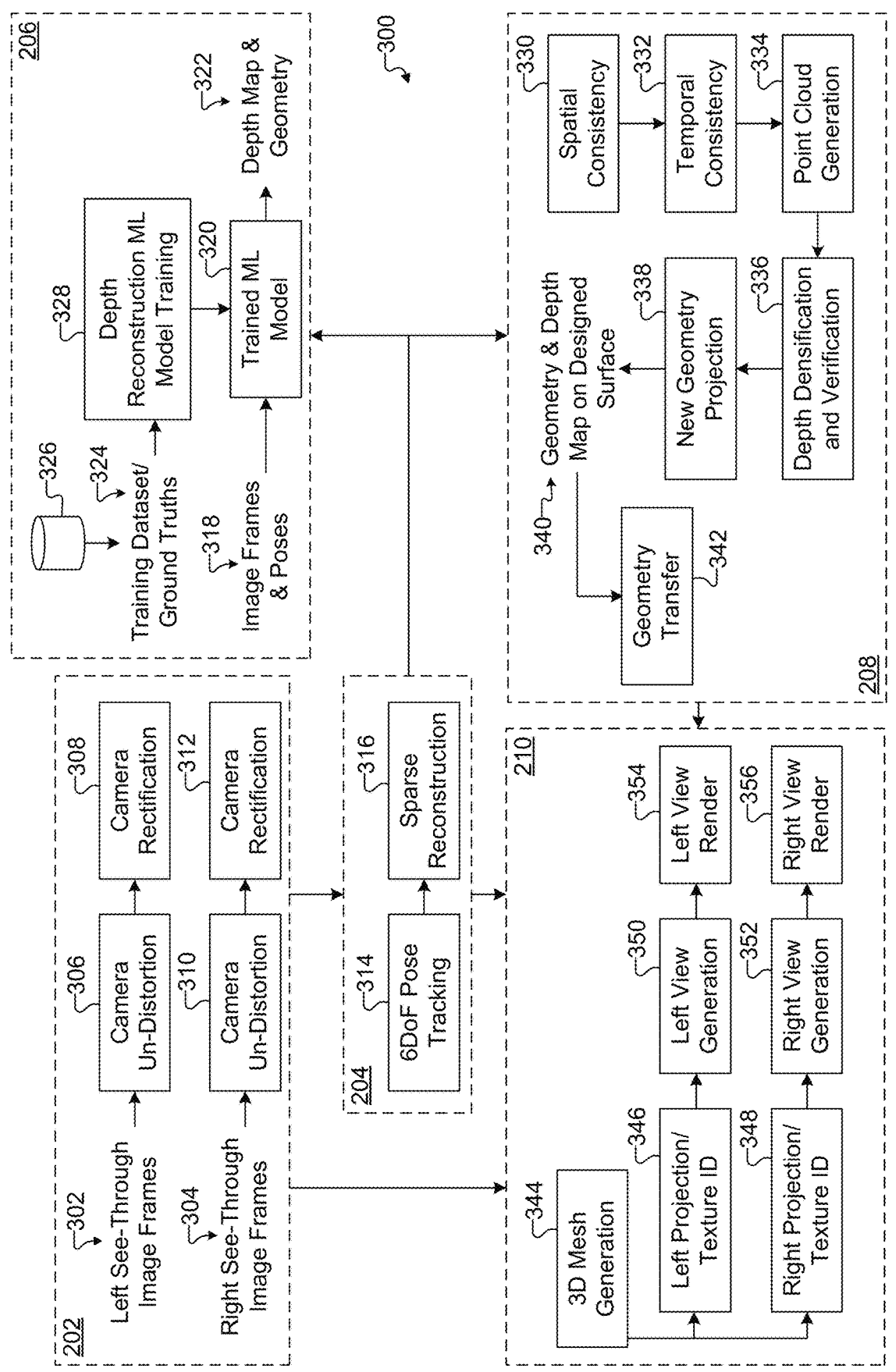
FIG. 3 illustrates a more detailed example architecture for generation and rendering of extended-view geometries in VST AR systems in accordance with this disclosure.

FIG. 3 illustrates a more detailed example architecture 300 for generation and rendering of extended-view geometries in VST AR systems in accordance with this disclosure. More specifically, the architecture 300 shown in FIG. 3 illustrates a specific implementation of the architecture 200 shown in FIG. 2. For ease of explanation, the architecture 300 of FIG. 3 is described as being implemented using the electronic device 101 in the network configuration 100 of FIG. 1. However, the architecture 300 may be implemented using any other suitable device(s) and in any other suitable system(s).

As shown in FIG. 3, the data capture operations 202 receive one or more left see-through image frames 302 and one or more right see-through image frames 304. The image frames 302 and 304 may, for example, represent image frames captured using left and right see-through cameras or other imaging sensors 180. Note that the terms "left" and "right" are used in this patent document to differentiate different image frames, imaging sensors, or other elements and do not impart any structural requirements on the electronic device 101 or other AR device. Each image frame 302 and 304 may have any suitable resolution and data format.

Each image frame 302 is processed using an un-distortion operation 306 and a rectification operation 308, and each image frame 304 is processed using an un-distortion operation 310 and a rectification operation 312. The un-distortion operations 306, 310 are used to correct for distortions that might be present in the image frames 302, 304 due to the design or operation of the electronic device 101. For example, an image frame 302, 304 may be distorted due to the physical or operational characteristics of the imaging sensor 180 that captured the image frame, and the un-distortion operation 306, 310 can operate to warp or otherwise reduce or remove these distortions from the image frame. In some embodiments, each un-distortion operation 306, 310 may have access to a distortion model and imaging sensor calibration parameters and may use this information to perform the image un-distortion. The distortion model represents a model of how an imaging sensor 180 is known to distort images, which (in some cases) may be generated during calibration of the imaging sensor 180. For instance, the imaging sensor 180 may capture images of known objects or scenes so that differences between captured and expected images may be identified and used to produce a model of how the imaging sensor 180 distorts the known objects or scenes. The imaging sensor calibration parameters represent specific parameters of the design or operation of the imaging sensor 180, such as the imaging sensor's focal length. The rectification operations 308, 312 are used to rectify or align the captured image frames. For instance, the rectification operations 308, 312 can align the image frames 302, 304 so that the corresponding epipolar lines of the image frames 302, 304 are colinear, which supports subsequent depth reconstruction. The un-distortion operations 306, 310 and the rectification operations 308, 312 can use any suitable techniques to un-distort and rectify image frames. For example, the un-distortion operations 306, 310 and the rectification operations 308, 312 may use the intrinsic and extrinsic parameters of the imaging sensors 180 to un-distort and rectify the images.

The pose tracking operations 204 in this example includes a 6DoF pose tracking operation 314 and a sparse reconstruction operation 316. The pose tracking operation 314 processes the image frames 302, 304 and optionally additional information (such as from an IMU or other positional sensor or sensors 180) to estimate poses of the imaging sensors 180 or the electronic device 101 during the capture of the image frames 302, 304. In some cases, each pose can be expressed using six degrees of freedom, which can include three distances and three angles. The three distances may represent the position of the imaging sensors 180 or electronic device 101 relative to a fixed location, such as the imaging sensor or electronic device's position from the fixed location as expressed in distances along three orthogonal axes. The three angles may represent the orientation of the imaging sensors 180 or electronic device 101 about these three axes, such as the imaging sensor or electronic device's pitch, roll, and yaw. The sparse reconstruction operation 316 operates to produce 3D sparse points, which can include a collection of 3D points identified in each of the image frames 302, 304. In some cases, the poses and the 3D sparse points for the image frames 302, 304 may be obtained simultaneously, such as by applying SLAM to the image frames 302, 304.

The geometry reconstruction operations 206 in this example are used to process inputs 318, which include the image frames 302, 304 (as un-distorted and rectified by the data capture operations 202) and the identified poses (as determined using the pose tracking operations 204). These inputs 318 are processed using a trained machine learning (ML) model 320, which processes the inputs 318 in order to generate outputs 322. The outputs 322 here include an initial depth map that defines the geometry of the scene captured in at least one stereo pair of the image frames 302, 304. The trained machine learning model 320 is trained to determine depths of the geometry within the scene based on the image frames 302, 304 and the pose(s) of the imaging sensors 180 or the electronic device 101 during the image capture. Note that the resolution of the image frames 302, 304 processed by the trained machine learning model 320 may be decreased in some cases, such as by down-scaling the image frames 302, 304 prior to processing by the trained machine learning model 320. As a result, each initial depth map contained in the outputs 322 and the associated geometry of the scene may have a lower resolution than the image frames 302, 304. This may be done to speed up processing by the trained machine learning model 320, which can help to satisfy low latency or other requirements of a VST AR pipeline.

The machine learning model 320 here can be trained in any suitable manner. For example, one or more training datasets and their associated ground truths 324 may be obtained, such as from at least one data store 326. Each training dataset can include images of known scenes, and the associated ground truths can represent known depths and geometries within the known scenes. During training, a depth reconstruction machine learning model training operation 328 can use the one or more training datasets and their associated ground truths 324 to train the machine learning model 320 how to generate depth maps and geometries based on the training images.

As a particular example, during training, the machine learning model 320 can process the images in at least one training dataset and generate outputs 322 containing predicted depths and geometries, and the predicted depths and geometries can be compared to the known depths and geometries in the ground truths. Differences or errors between the predicted and known depths and geometries can be identified and used to determine a loss value associated with the machine learning model 320. If the loss value exceeds a threshold, weights or other parameters of the machine learning model 320 can be adjusted, and images from the same training dataset(s) or at least one different training dataset can be provided to the updated machine learning model 320. The updated machine learning model 320 can process the images in at least one training dataset and generate additional outputs 322 containing predicted depths and geometries, and the predicted depths and geometries can be compared to the known depths and geometries in the ground truths in order to calculate an additional loss value. This process can be repeated iteratively any number of times. Ideally, the loss value decreases over time, and this process can continue until the machine learning model 320 accurately generates predicted depth maps and geometries (at least to within some specified level of accuracy as defined by the threshold). During this process, the machine learning model 320 learns the relationships between images and their associated depth maps and geometries.

The trained machine learning model 320 may use any suitable technique to generate depth maps and geometries based on image frames and poses and can have any suitable machine learning model-based structure. In some embodiments, for instance, the trained machine learning model 320 may represent or include a DNN, CNN, other neural network, or other machine learning model. Note that while the architecture 300 in this example includes the elements 324-328 shown in FIG. 3 for training the machine learning model 320, this is for illustration and explanation only. In many embodiments, the electronic device 101 can receive the machine learning model 320 after the machine learning model 320 has been trained by another component (such as the server 106). Thus, for instance, the server 106 may include or have access to the at least one data store 326, and the server 106 may perform the depth reconstruction machine learning model training operation 328 using the one or more training datasets and their associated ground truths 324 in order to train the machine learning model 320. The server 106 can then deploy the trained machine learning model 320 to one or more AR devices, such as the electronic device 101, for use. Of course, the machine learning model 320 may be trained in any other suitable manner.

Note that the operations 202-206 described above may be used to process sequences of image frames 302, 304 captured by the imaging sensors 180, such as when multiple left image frames 302 and multiple right image frames 304 are obtained and processed. Often times, the image frames 302, 304 form stereo image pairs, where each stereo image pair includes one image frame 302 and image frame 304 that are captured at or substantially at the same time and where different stereo image pairs are captured sequentially at different times. In these embodiments, the pose tracking operations 204 can identify multiple poses, such as a pose for each stereo image pair. Also, the geometry reconstruction operations 206 can generate multiple outputs 322, such as one set of outputs 322 (like an initial depth map and a geometry) for each stereo image pair.

The outputs 322 generated by the geometry reconstruction operations 206, as well as the poses and 3D sparse points generated by the pose tracking operations 204, are provided to the geometry computation operations 208. The geometry computation operations 208 are used to process this information in order to clarify or filter depths contained in each initial depth map generated by the geometry reconstruction operations 206, which can lead to the generation of a refined depth map. In some embodiments, the geometry reconstruction operations 206 can filter and refine each initial depth map in order to ensure both spatial consistency and temporal consistency in the resulting refined depth map.

The geometry reconstruction operations 206 in this example include a spatial consistency processing operation 330 and a temporal consistency processing operation 332. The spatial consistency processing operation 330 generally operates to process each initial depth map and ensure that the depths identified in the initial depth map are spatially consistent given the pair of image frames 302, 304 used to generate that initial depth map. The temporal consistency processing operation 332 generally operates to process multiple initial depth maps and ensure that the depths identified in the initial depth maps are temporally consistent. Note that the spatial consistency processing operation 330 and the temporal consistency processing operation 332 can operate sequentially in any order. As a result, depth maps processed by the first processing operation 330 or 332 may represent initial depth maps from the geometry reconstruction operations 206, and depth maps processed by the second processing operation 332 or 330 may represent the initial depth maps as modified by the first processing operation 330 or 332.

When spatial or temporal inconsistencies are identified, the spatial consistency processing operation 330, temporal consistency processing operation 332, or both can modify depth values contained in the initial depth maps in order to produce the refined depth maps. For example, the spatial consistency processing operation 330 may apply a spatial filter to depth values in order to smooth inconsistent depth values, and the temporal consistency processing operation 332 may apply a temporal filter to depth values in order to smooth inconsistent depth values. Among other things, the spatial consistency processing operation 330 and the temporal consistency processing operation 332 help to provide noise reduction. Example implementations of the spatial consistency processing operation 330 and the temporal consistency processing operation 332 are described in more detail below. Note that spatial or temporal consistency (but not both) may be implemented in other embodiments.

A point cloud generation operation 334 processes one or more refined depth maps and one or more associated geometries in order to create at least one 3D representation of the scene captured in the image frames 302, 304. For example, the point cloud generation operation 334 can generate a 3D point cloud representative of the environment around the electronic device 101. A 3D point cloud represents a collection of points within a 3D space around the electronic device 101, and these points are often associated with real-world objects in the 3D space around the electronic device 101. Among other things, the point cloud generation operation 334 can use the depths contained in the refined depth map(s) in order to identify specific points in the 3D space as defined by the associated geometry or geometries. In some cases, the point cloud generation operation 334 integrates 3D points as determined using the image frames 302, 304 and sparse depth points as determined using the sparse reconstruction operation 316.

As noted above, in some instances, the resolution of the image frames 302, 304 can be decreased prior to processing using the trained machine learning model 320. Because of this, the outputs 322 can include initial depth maps and geometries having lower resolution than the image frames 302, 304. To help compensate for the resulting loss of detail, each 3D point cloud or other 3D representation of the scene can be processed using a depth densification and verification operation 336, which can perform interpolation or other functions to identify additional depths in the refined depth maps and additional points of the associated geometries. Among other things, this can lead to the generation of higher-resolution depth maps and higher-resolution geometries. In some cases, the higher-resolution depth maps and higher-resolution geometries can have a resolution matching the resolution of the image frames 302, 304.

A new geometry projection operation 338 projects each reconstructed geometry of the scene captured in the image frames 302, 304 (as defined by previous operations in the geometry computation operations 208) onto a curved surface. As noted above, the curved surface represents a designed surface intended to provide an extended or enhanced field of view (such as a wider field of view) for a user of the electronic device 101. In some embodiments, the curved surface represents a portion of a cylindrical surface, a portion of a spherical surface, or a portion of a conical surface. The new geometry projection operation 338 can project each reconstructed geometry onto the curved surface, such as by projecting various points of the reconstructed geometry onto the curved surface. As described below, this can be done using various transformations, and the specific transformations used can depend on the actual structure of the curved surface being used. In this way, the new geometry projection operation 338 can be used to generate outputs 340 that include a geometry and a depth map of each reconstructed geometry as projected onto the curved surface. A geometry transfer operation 342 may optionally be used here to transfer at least some of the outputs 340 to another destination, such as a GPU vertex shader, for further processing.

The geometry rendering operations 210 in this example include a 3D mesh generation operation 344, which generally operates to generate a 3D mesh of points as defined by each reconstructed geometry after the reconstructed geometry is projected onto the curved surface. For example, the 3D mesh generation operation 344 may identify various vertices within the reconstructed geometry after the reconstructed geometry is projected onto the curved surface. The 3D mesh of points is provided to left and right projection and texture identification operations 346 and 348, which generally operate to project the 3D mesh of points back to the image planes associated with the imaging sensors 180. The left and right projection and texture identification operations 346 and 348 also generally operate to identify colors and other texture-related information based on where the mesh points are projected onto the image planes associated with the imaging sensors 180. For instance, the projection and texture identification operations 346 and 348 can be used to identify colors and other texture-related information contained in the image frames 302, 304 at and between the locations of the mesh points as projected back onto the image planes associated with the imaging sensors 180.

Left and right view generation operations 350 and 352 generally operate to generate left and right virtual view images, which represent images of the scene captured by the image frames 302, 304 but at image planes associated with virtual camera positions. For example, each of the left and right view generation operations 350 and 352 can project the mesh points associated with each reconstructed geometry from the curved surface to an image plane associated with a virtual camera position. This can be done for each of left and right virtual camera positions, which can be associated with left and right eyes of a user. Left view and right view rendering operations 354 and 356 can render the left and right virtual view images for presentation on one or more displays, such as one or more displays 160 of the electronic device 101. The identified colors and other texture-related information can be used to generate or render the left and right virtual view images. Thus, the end result here is that the left and right virtual view images allow the user to see images that integrate transformed real-world information from the imaging sensors 180 and one or more virtual objects.

In some embodiments, the various operations 202-210 shown in FIGS. 2 and 3 may be performed using one or more processing devices. If multiple processing devices are used, the processing devices may represent the same type of processing device or different types of processing devices.

As a particular example, the data capture operations 202 and the pose tracking operations 204 may be performed using one or more CPUs, the geometry reconstruction operations 206 may be performed using one or more NPUs, and the geometry computation operations 208 and the geometry rendering operations 210 may be performed using one or more GPUs. This may allow, for instance, each of the operations 202-210 to be performed using the most appropriate or beneficial hardware that is available. Note, however, that the operations 202-210 may be implemented in any other suitable manner. Also, the use of mesh points to support various projections described above is optional and represents one example way in which the projections may be performed. Details of specific techniques for using mesh points to support projections are provided in U.S. patent application Ser. No. 18/296,302 filed on Apr. 5, 2023 (which is hereby incorporated by reference in its entirety). However, any other suitable projection techniques may be used here.

Overall, the architectures 200 and 300 shown in FIGS. 2 and 3 enable the creation of a reconstructed geometry with a wider field of view, where the reconstructed geometry is generated using one or more depth maps of a captured scene and where the depth map(s) can have spatial and temporal consistencies. The projection of the reconstructed geometry of the captured scene onto a designed curved surface produces a wide-angle view, and the reconstructed geometry as projected onto the designed surface can be projected to left and right see-through camera positions in order to extract colors and other texture-related information. In addition, the ability to create cylindrical, spherical, conical, or other meshes allows the reconstructed geometry to be projected to left and right virtual views, which allows virtual view images to be generated, rendered, and displayed. As a result, the field of view that is achievable can be extended by projecting the reconstructed geometry of the captured image frames to the designed surface so that a wide-angle view from the designed surface can be formed. In some cases, this approach can provide very wide fields of view, such as up to and including a 180° field of view. As particular examples, when a portion of a cylindrical surface is used as the curved surface, the field of view could be up to 180° horizontally or vertically. When a portion of a spherical surface is used as the curved surface, the field of view could be up to 180° horizontally and vertically.

Although FIGS. 2 and 3 illustrate examples of architectures 200 and 300 for generation and rendering of extended-view geometries in VST AR systems, various changes may be made to FIGS. 2 and 3. For example, various components and functions in FIGS. 2 and 3 may be combined, further subdivided, replicated, omitted, or rearranged and additional components and functions may be added according to particular needs. As a particular example, the generation of the initial depth maps by the geometry reconstruction operations 206 and the refinement of the initial depth maps by the geometry computation operations 208 could be combined, such as when the machine learning model 320 is trained to generate depth maps having spatial and temporal consistencies. In some embodiments, this may be accomplished by training the machine learning model 320 using one or more loss functions that incorporate considerations of spatial and temporal consistencies, which can help to train the machine learning model 320 to produce depth maps and geometries that are already refined by spatial and temporal consistencies. Also, the specific implementations of the operations 202-210 from FIG. 2 as shown in FIG. 3 are for illustration and explanation only. Each of the operations 202-210 may be implemented in any other suitable manner. In addition, while FIG. 3 illustrates various pairs of operations occurring in parallel (such as operations 306 and 310, operations 308 and 312, operations 346-348, operations 350-352, or operations 354-356), other embodiments may perform a common operation sequentially multiple times in order to achieve the same or similar results.

Figure 4:
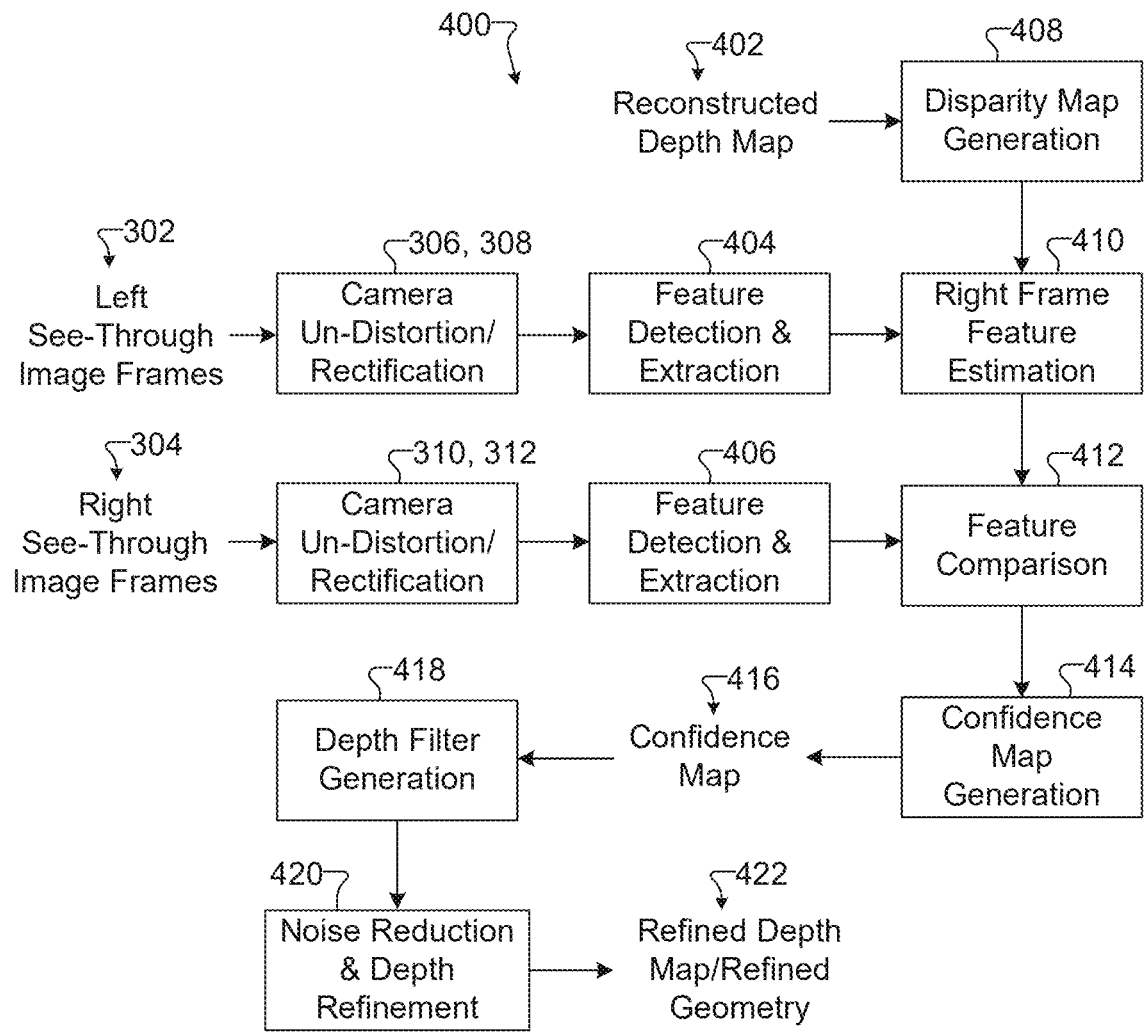
FIG. 4 illustrates an example process for generating a depth map having spatial consistency in accordance with this disclosure.

FIG. 4 illustrates an example process 400 for generating a depth map having spatial consistency in accordance with this disclosure. More specifically, the process 400 shown in FIG. 4 may be performed during or as part of the spatial consistency processing operation 330 shown in FIG. 3 and described above. For ease of explanation, the process 400 of FIG. 4 is described as being implemented using the electronic device 101 in the network configuration 100 of FIG. 1. However, the process 400 may be implemented using any other suitable device(s) and in any other suitable system(s).

As shown in FIG. 4, the process 400 generally operates using one or more left image frames 302, one or more right image frames 304, and at least one reconstructed depth map 402 as inputs. Each reconstructed depth map 402 may represent an initial depth map generated by the trained machine learning model 320 and included in the outputs 322 (which may or may not first be processed and refined using the temporal consistency processing operation 332). Due to various issues, the reconstructed depth map 402 can include noise, such as incorrect depth values for a scene. Without compensation, this noise can affect subsequent processing operations and result in unrealistic contents contained in the left and right virtual view images generated as discussed above.

In this example, each pair of left and right image frames 302 and 304 is respectively processed using the un-distortion operations 306 and 310 and respectively processed using the rectification operations 308 and 312. The resulting un-distorted and rectified image frames are respectively provided to left and right feature detection and extraction operations 404 and 406, which process the un-distorted and rectified image frames in order to extract specific features from the image frames. For example, each of the feature detection and extraction operations 404 and 406 may include one or more convolution layers, other neural network layers, or other machine learning layers that process image data in order to identify specific features that the machine learning layers have been trained to recognize.

Each reconstructed depth map 402 is provided to a disparity map generation operation 408, which processes the reconstructed depth map 402 in order to generate a disparity map. A disparity refers to the apparently difference in the same point's position in different image frames, which in some cases can be caused when the image frames are captured by different imaging sensors 180 at different locations. Depth and disparity are related to one another, and in some cases this relationship can be defined as follows.

$$D = \frac{Bf}{d} \quad (1)$$

Here, B represents a baseline distance between the imaging sensors 180 used to capture the image frames 302 and 304, f represents the focal length of the imaging sensors 180, and d represents depth as defined in the reconstructed depth map 402. The disparity map generation operation 408 can therefore use Equation (1) or another approach to convert depths contained in the reconstructed depth map 402 into disparities contained in a corresponding disparity map.

Spatial consistency for the reconstructed depth map 402 can be achieved when the depths as defined in the reconstructed depth map 402 are the same or substantially the same for common points or other common locations in a stereo image pair of a left image frame 302 and a right image frame 304. To check for spatial consistency, a right image frame feature estimation operation 410 is used to generate predicted features for the right image frame 304 based on the disparity map and the actual features generated for the left image frame 302. A feature comparison operation 412 compares the actual features for the right image frame 304 (as generated by the feature detection and extraction operation 406) with the predicted features for the right image frame 304 (as generated by the feature estimation operation 410) in order to identify the consistencies of the actual and predicted features for the right image frame 304. For instance, the feature comparison operation 412 may identify differences between the actual and predicted features for the right image frame 304. The identified differences are used by a confidence map generation operation 414 to create a confidence map 416, which identifies the consistencies of the depths contained in the reconstructed depth map 402. For example, the confidence map 416 may include a confidence score for various locations (such as each pixel location) in the reconstructed depth map 402, where each confidence score identifies the consistency or lack thereof between the actual and predicted features for the right image frame 304 at that location. In some cases, higher confidence scores may be associated with larger consistencies, while lower confidence scores may be associated with smaller or no consistencies. Note that a similar approach could be used by having the feature estimation operation 410 generate predicted features for the left image frame 302 based on the disparity map and the actual features generated for the right image frame 304, where the confidence map 416 is generated based on the consistencies of the actual and predicted features for the left image frame 302.

A depth filter generation operation 418 uses the confidence map 416 to design a spatial depth filter, and a noise reduction and depth refinement operation 420 processes the reconstructed depth map 402 based on the generated spatial depth filter. For example, the depth filter generation operation 418 may generate a spatial depth filter that is applied to pixel values contained in the reconstructed depth map 402 in order to smooth or otherwise filter out depth values having lower confidences. As a particular example, the spatial depth filter can be designed and applied in order to refine the depth values in the reconstructed depth map 402 that are associated with lower confidence scores in the confidence map 416, such as depth values associated with confidence scores that fall below a threshold value. The noise reduction and depth refinement operation 420 applies the spatial depth filter in order to modify the depth values contained in the reconstructed depth map 402. This results in the generation of a refined depth map 422, which defines or is otherwise associated with a refined geometry of the scene captured in the image frames 302, 304. Note that the depth filter used here is referred to as a spatial depth filter since the depth filter is used to filter spatially-inconsistent depth values.

Figure 5:
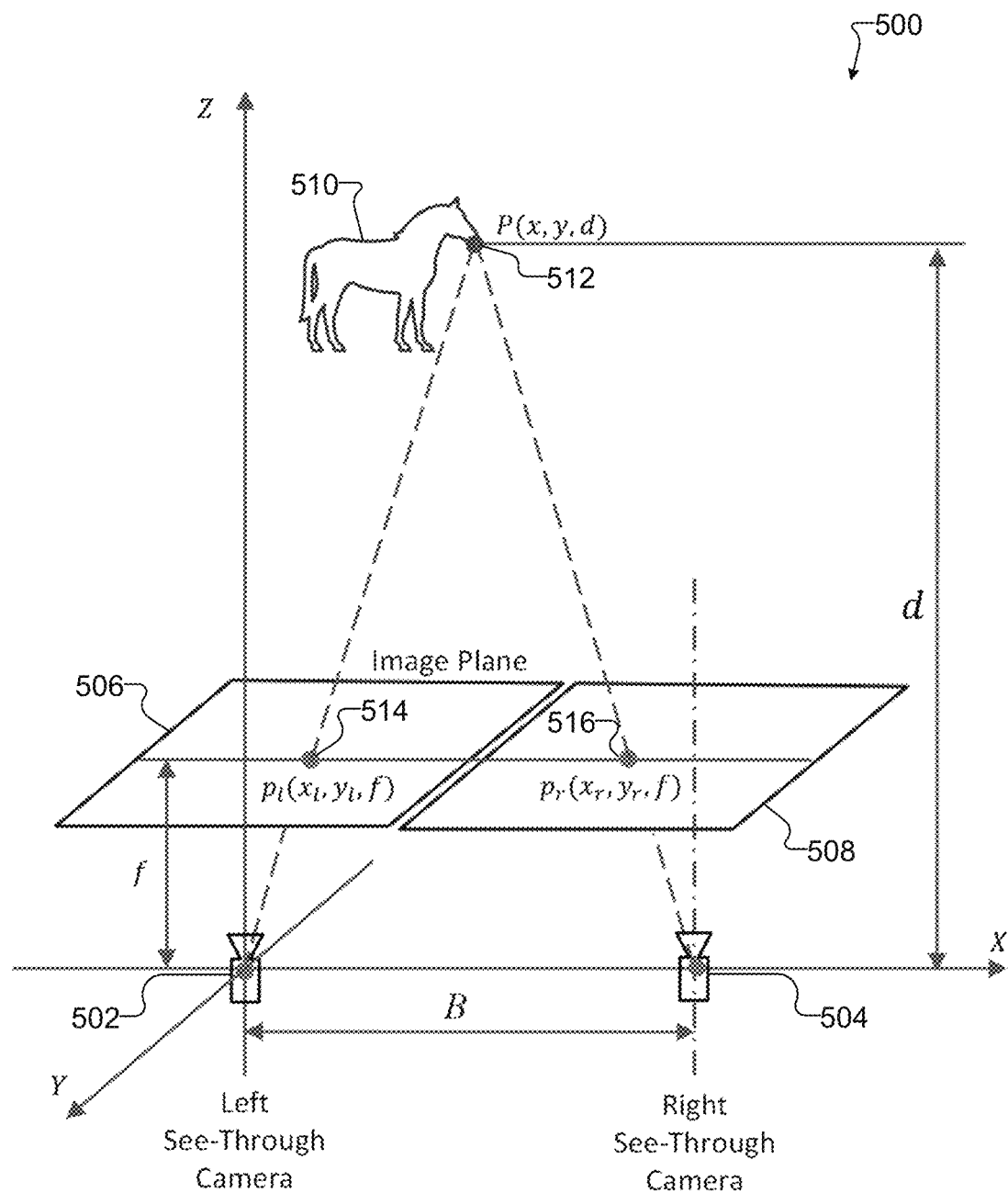
FIG. 5 illustrates an example mechanism for verifying spatial consistency between a stereo image pair of image frames in accordance with this disclosure.

FIG. 5 illustrates an example mechanism 500 for verifying spatial consistency between a stereo image pair of image frames in accordance with this disclosure. This mechanism 500 represents one example way in which the confidence scores of the confidence map 416 of FIG. 4 may be generated. As shown in FIG. 5, two see-through cameras 502 and 504 are being used and may represent two imaging sensors 180 of the electronic device 101. The see-through camera 502 is associated with an image plane 506, and the see-through camera 504 is associated with an image plane 508. The image planes 506 and 508 are separated from the see-through cameras 502 and 504 by a distance referred to as the focal length f of the see-through cameras 502 and 504. The see-through cameras 502 and 504 are being used to capture images of a scene that includes an object 510, which in this example represents an animal (although the scene may include any other or additional objects). A specific point 512 of the object 510 is identified in FIG. 5. That point 512 is separated from the see-through cameras 502 and 504 by a depth d, and the three-dimensional position of the point 512 can be denoted P(x, y, d). Central axes of the see-through cameras 502 and 504 are separated by a distance B, which represents the baseline distance between the see-through cameras 502 and 504.

Due to the physical separation of the see-through cameras 502 and 504, the point 512 of the object 510 appears at different locations 514 and 516 on the respective image planes 506 and 508 of the see-through cameras 502 and 504. In this example, the point has a position of $p_l(x_l, y_l, f)$ at the location 514 on the image plane 506 and a position of $p_r(x_r, y_r, f)$ at the location 516 on the image plane 508. Thus, while the depth coordinates of the locations 514 and 516 may be the same, the x and y coordinates of the locations 514 and 516 may differ. If the see-through cameras 502 and 504 are perfectly level, they coordinates of the locations 514 and 516 may be equal (meaning $y_l=y_r$). In that case, the relationship between the locations 514 and 516 of the point 512 as projected onto the image planes 506 and 508 may be expressed as follows.

$$\begin{cases} x_r = x_l - \dfrac{Bf}{d} \\ y_r = y_l \end{cases} \quad (2)$$

As can be seen here, the difference in the values of $x_l$ and $x_r$ is the disparity.

Based on Equations (1) and (2) above, it is possible to use the disparity map as generated by the disparity map generation operation 408 to convert the features as identified for one of the image frames 302 or 304 into predicted features for the other of the image frames 304 or 302. For example, the feature estimation operation 410 can take the values of xi as determined for the features of the left image frame 302 and subtract the corresponding disparity values in the disparity map as generated by the disparity map generation operation 408. This gives predicted values of $x_r$ for the features of the right image frame 304. By comparing the predicted values of $x_r$ to the actual values of $x_r$ as generated by the feature detection and extraction operation 406, it is possible for the feature comparison operation 412 to determine whether the depths as contained in the reconstructed depth map 402 for those features are consistent between the two image frames 302, 304. This allows the confidence map generation operation 414 to generate confidence scores for those features based on the determination. For example, if the difference between the actual and predicted values of $x_r$ for a feature is less than a threshold, a highest confidence score may be assigned to that feature. If the difference between the actual and predicted values of $x_r$ for a feature is greater than the threshold, a lowest confidence score may be assigned to that feature. A specific value from a range of confidence scores may also be selected and assigned to that feature based on the amount or percentage that the difference between the actual and predicted values of $x_r$ exceeds the threshold.

Although FIG. 4 illustrates one example of a process 400 for generating a depth map having spatial consistency and FIG. 5 illustrates one example of a mechanism 500 for verifying spatial consistency between a stereo image pair of image frames, various changes may be made to FIGS. 4 and 5. For example, various components and functions in FIG. 4 may be combined, further subdivided, replicated, omitted, or rearranged and additional components and functions may be added according to particular needs. Also, the use of disparity in the specific manner shown in FIG. 5 is one example technique to verify spatial consistency of depth values, although any other or additional techniques may be used. In addition, while FIG. 4 illustrates various pairs of operations occurring in parallel (such as operations 306/310 and 308/312, or operations 404 and 406), other embodiments may perform a common operation sequentially multiple times in order to achieve the same or similar results.

Figure 6:
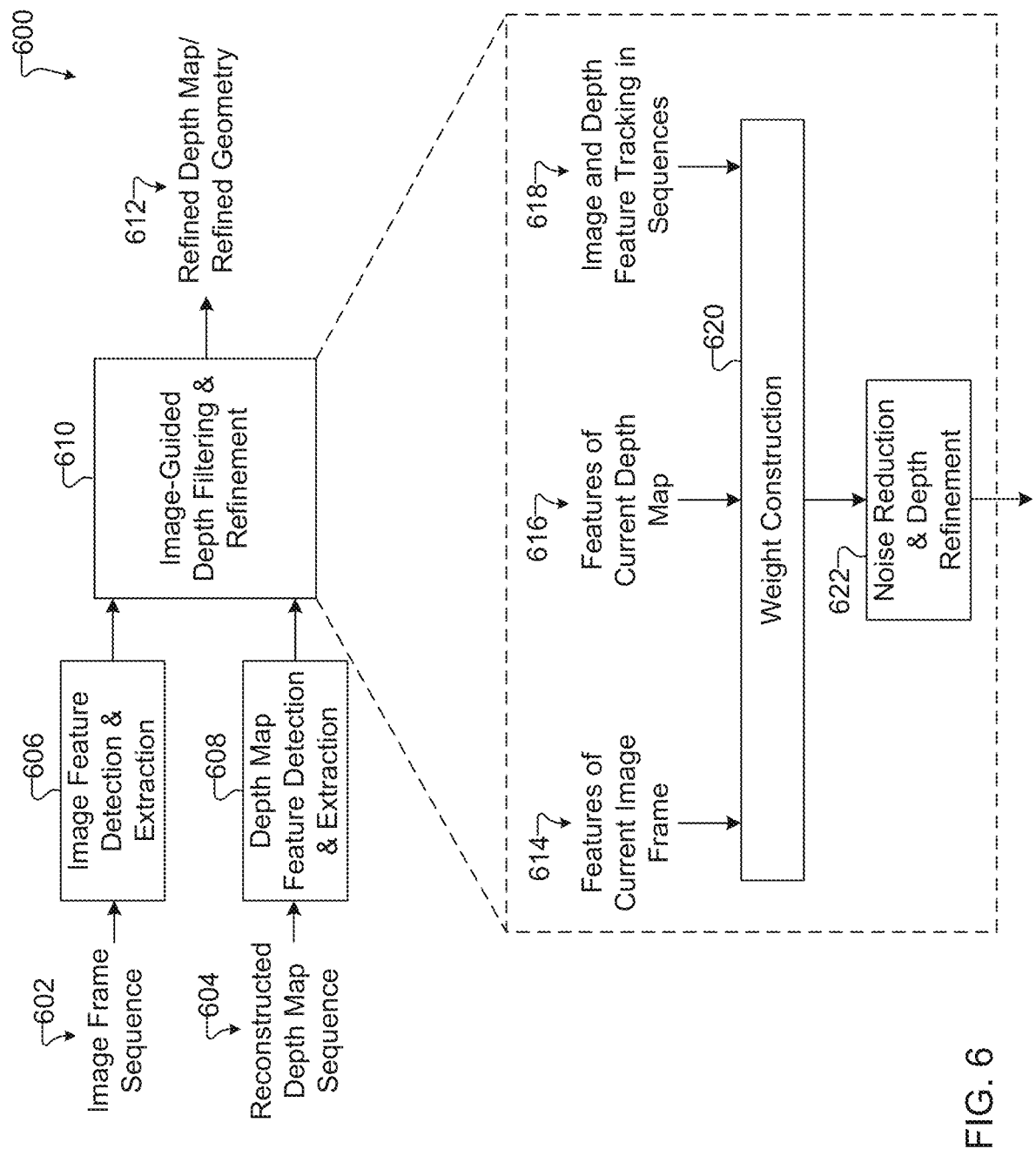
FIG. 6 illustrates an example process for generating a depth map having temporal consistency in accordance with this disclosure.

FIG. 6 illustrates an example process 600 for generating a depth map having temporal consistency in accordance with this disclosure. More specifically, the process 600 shown in FIG. 6 may be performed during or as part of the temporal consistency processing operation 332 shown in FIG. 3 and described above. For ease of explanation, the process 600 of FIG. 6 is described as being implemented using the electronic device 101 in the network configuration 100 of FIG. 1. However, the process 600 may be implemented using any other suitable device(s) and in any other suitable system(s).

As shown in FIG. 6, the process 600 generally operates using a sequence of image frames 602 and a sequence of reconstructed depth maps 604 as inputs. The sequence of image frames 602 can include multiple image frames 302 or 304 captured at different times (such as in rapid succession) by the same imaging sensor 180. The sequence of reconstructed depth maps 604 can include multiple initial depth maps generated by the trained machine learning model 320 and included in the outputs 322 (which may or may not first be processed and refined using the spatial consistency processing operation 330).

An image feature detection and extraction operation 606 processes the sequence of image frames 602 in order to extract a sequence of specific features from the image frames, and a depth map feature detection and extraction operation 608 processes the sequence of reconstructed depth maps 604 in order to extract a sequence of specific features from the reconstructed depth maps. For example, each of the feature detection and extraction operations 606 and 608 may include one or more convolution layers, other neural network layers, or other machine learning layers that process image data or depth data in order to identify specific features that the machine learning layers have been trained to recognize. The extracted features for the sequence of image frames 602 may include features of the individual image frames and possibly features associated with the sequence of image frames 602. Similarly, the extracted features for the sequence of reconstructed depth maps 604 may include features of the individual reconstructed depth maps and possibly features associated with the sequence of reconstructed depth maps 604.

The extracted features are provided to an image-guided depth filtering and refinement operation 610, which processes the features in order to determine how to filter one or more of the reconstructed depth maps in the sequence of reconstructed depth maps 604. The image-guided depth filtering and refinement operation 610 can therefore generate one or more refined depth maps 612, which define or are otherwise associated with one or more refined geometries of the scene captured in the sequence of image frames 602. The image-guided depth filtering and refinement operation 610 is said to represent an "image-guided" depth filtering and refinement operation since the operation 610 filters and refines one or more reconstructed depth maps while being guided by the contents of the image frames.

In this example, the image-guided depth filtering and refinement operation 610 receives features 614 of a current image frame being processed in the sequence of image frames 602, features 616 of the associated reconstructed depth map in the sequence of reconstructed depth maps 604, and tracking 618 of features associated with one or more neighboring image frames and one or more neighboring reconstructed depth maps in the sequences as inputs. The tracking 618 of features may, for example, include image features from at least one prior image frame and/or at least one subsequent image frame or information defining how those image features have changed. Similarly, the tracking 618 of features may include depth map features from at least one prior reconstructed depth map and/or at least one subsequent reconstructed depth map or information defining how those depth map features have changed.

These inputs are provided to a weight construction operation 620, which can determine weights to be used by a temporal depth filter. For example, the weight construction operation 620 may generate weights for a temporal depth filter that is applied to pixel values contained in one or more of the reconstructed depth maps in the sequence of reconstructed depth maps 604 (such as the current reconstructed depth map) in order to smooth or otherwise filter out depth values that appear incorrect in a temporal sense. As a particular example, the temporal depth filter can be designed and applied in order to refine the depth values in one or more of the reconstructed depth maps in the sequence of reconstructed depth maps 604 when depth values for a common point have statistically significantly differences in a succession of depth maps. A noise reduction and depth refinement operation 622 processes the sequence of reconstructed depth maps 604 based on the generated temporal depth filter, such as by applying the temporal depth filter to pixel values contained in one or more reconstructed depth maps in order to smooth or otherwise filter out depth values appearing incorrect. This results in the generation of the at least one refined depth map 612. This approach helps to obtain depth maps that are temporally consistent, meaning the depth maps identify consistent depths given the sequence of image frames 602. Note that the depth filter used here is referred to as a temporal depth filter since the depth filter is used to filter temporally-inconsistent depth values.

Although FIG. 6 illustrates one example of a process 600 for generating a depth map having temporal consistency, various changes may be made to FIG. 6. For example, various components and functions in FIG. 6 may be combined, further subdivided, replicated, omitted, or rearranged and additional components and functions may be added according to particular needs. Also, while FIG. 6 illustrates one example technique to verify temporal consistency of depth values, any other or additional techniques may be used.

FIGS. 7 through 10 illustrate example projections of a 3D representation of a scene onto a curved surface in order to provide an extended field of view in accordance with this disclosure. The projections shown here may, for example, represent how various operations in the architecture 200 or 300 described above may be performed. For ease of explanation, the projections of FIGS. 7 through 10 are described as being performed using the electronic device 101 in the network configuration 100 of FIG. 1. However, the projections may be performed using any other suitable device(s) and in any other suitable system(s).

Figure 7:
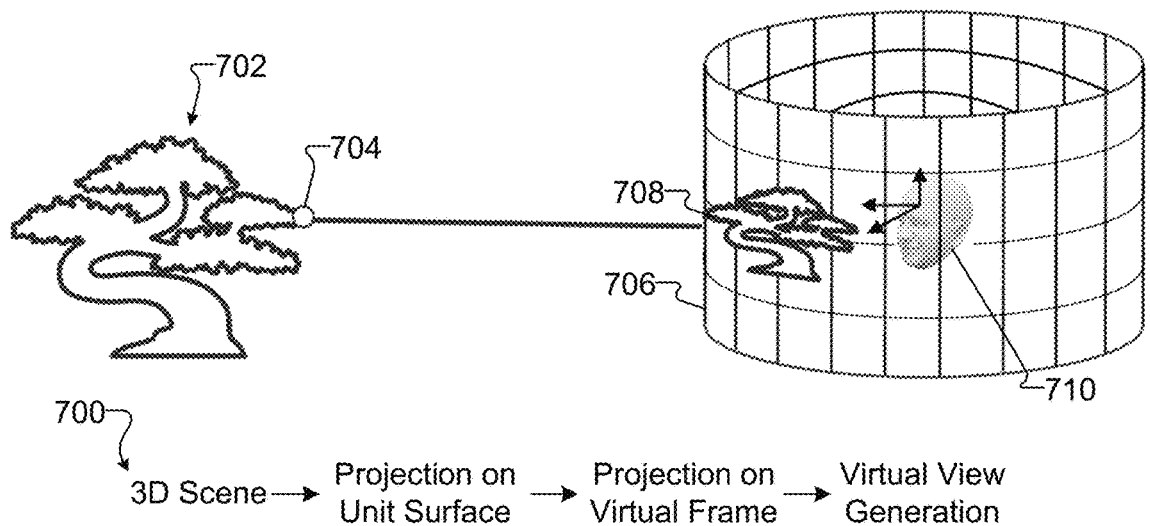
FIGS. 7 through 10 illustrate example projections of a three-dimensional (3D) representation of a scene onto a curved surface in order to provide an extended field of view in accordance with this disclosure.
Figure 8:
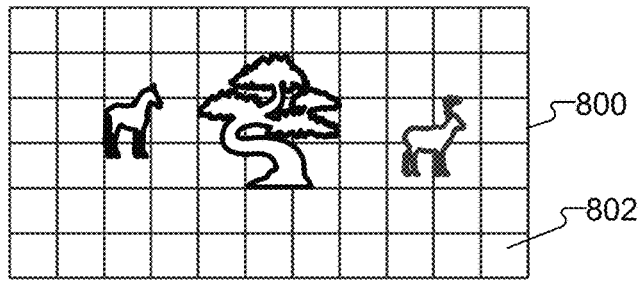
Figure 9:
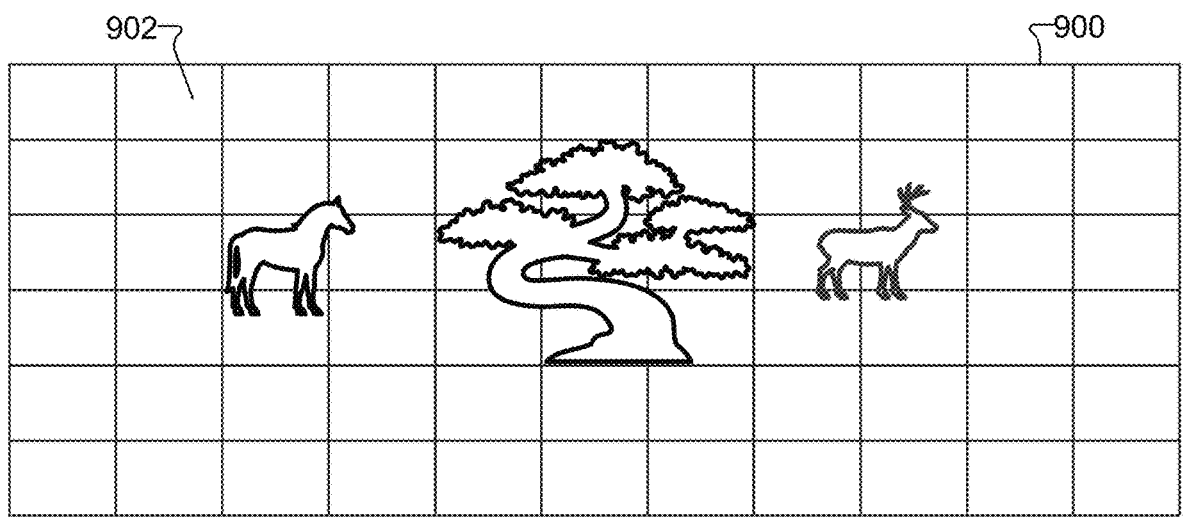

As shown in FIG. 7, the architecture 200 or 300 supports an overall process 700 that projects a 3D scene onto a curved surface, projects the curved surface onto a virtual image frame, and generates a virtual view image based on the projection onto the virtual image frame. Here, the 3D scene includes an object 702 that is captured in the image frames 302, 304. In this particular example, the object 702 represents a tree, although the scene may include any other or additional objects. A specific point 704 of the tree is identified in FIG. 7. Image frames 302, 304 capturing the object 702 are used to generate an initial depth map associated with an initial geometry, and the initial geometry is projected onto a curved surface 706. In this example, the curved surface 706 includes a portion of a cylindrical surface (although a spherical, conical, or another curved surface may be used). This leads to the creation of a projected object 708 on the curved surface 706. The curved surface 706 here can be centered on or otherwise associated with a user 710.

A geometry of the scene that includes the object 702 can be generated using the techniques described above. Rather than projecting the object 702 directly to the user's virtual view, the object 702 is projected onto the curved surface 706, which is designed to increase the user's field of view. Using the techniques described above, the geometry of the scene is identified and projected onto the curved surface 706, and it is that geometry (rather than the original scene geometry) that is used to generate the left and right virtual view images presented to the user 710. The left and right virtual view images include a visualization of the projected object 708 on the curved surface 706. The process described above can both remove noise from the depths associated with the geometry and extend the user's field of view.

As part of this process, a depth map (such as a depth map 800 shown in FIG. 8) may be generated. The depth map can also be projected onto the curved surface 706 to produce a projected depth map (such as a projected depth map 900 shown in FIG. 9). Note that the curved surface 706 has been unwrapped in FIG. 9 for convenience of illustration. In some embodiments, the depth map 800 may represent a refined depth map generated using one or both of the spatial consistency processing operation 330 and the temporal consistency processing operation 332 of the geometry computation operations 208. Also, in some embodiments, the projected depth map 900 may represent a projected depth map included in the outputs 340 of the geometry computation operations 208.

As shown here, the depth map 800 may be divided into a number of unit cells 802, which can match the number of unit cells 902 associated with the curved surface 706 onto which the depth map 800 will be projected. The unit cells 802 in the depth map 800 are mapped to the corresponding unit cells 902 on the curved surface 706, and the contents of the unit cells 802 in the depth map 800 can be expanded or otherwise modified as needed to fill in the unit cells 902 on the curved surface 706. This process may be repeated for any number of depth maps in a sequence.

Figure 10:
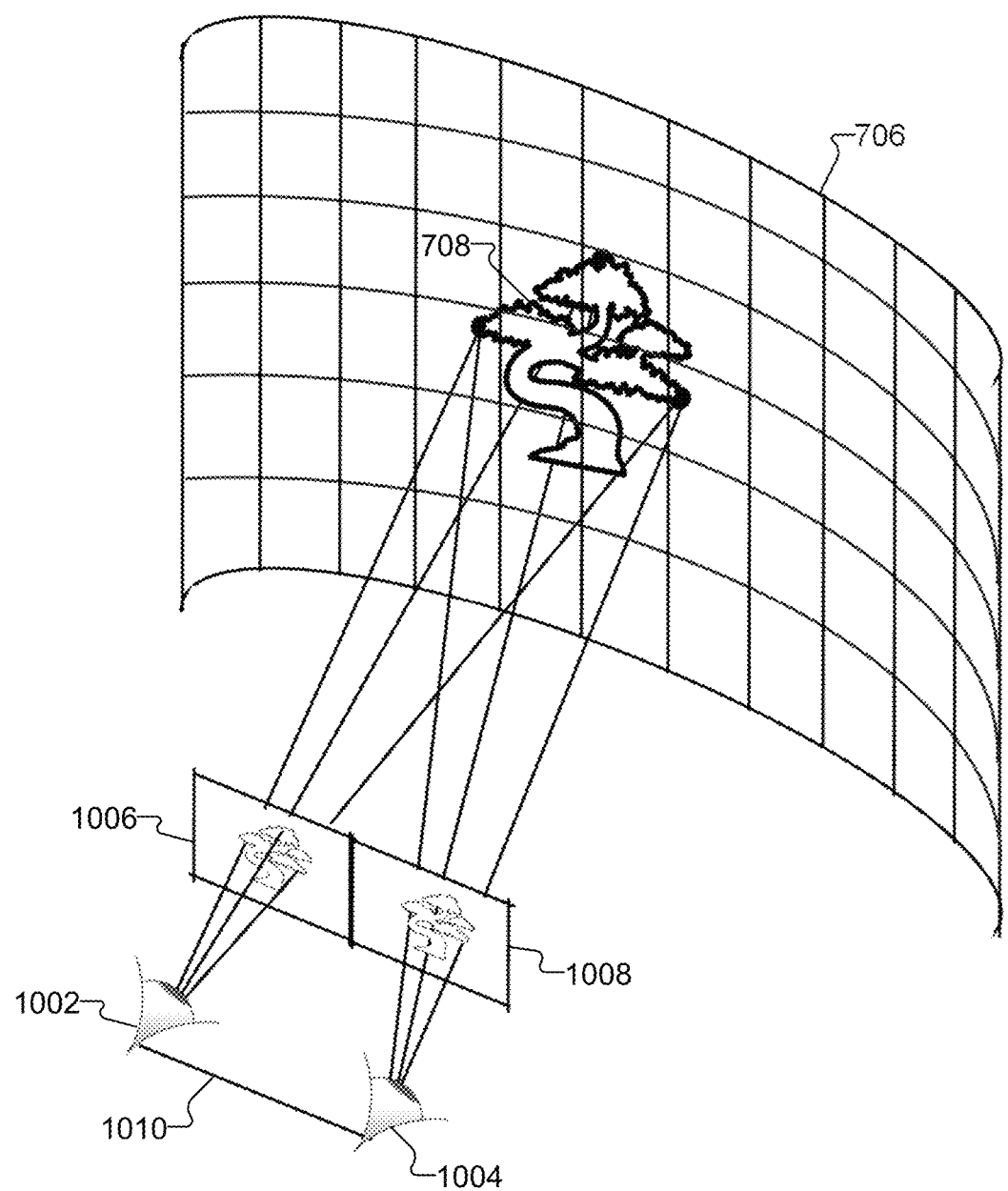

Each resulting projected depth map 900 may be used to generate left and right virtual view images for presentation to the user 710. An example of this is shown in FIG. 10, where two eyes 1002 and 1004 of the user 710 are viewing left and right virtual view images 1006 and 1008. The left and right virtual view images 1006 and 1008 are generated so that (from the perspective of the user 710) it appears that the user 710 is viewing the projected object 708 on the curved surface 706. In reality, the user 710 is viewing two virtual view images 1006 and 1008 that give the appearance of the projected object 708 on the curved surface 706. This is possible because, according to the configuration of the AR headset or other electronic device 101 in use, the positions of the viewpoints of the user's eyes 1002 and 1004 and an inter-pupillary distance 1010 between those viewpoints can be known. Moreover, the depths of various points on the curved surface 706 are known, and it is assumed that the user 710 is at the center of curvature of the curved surface 706. This allows the architecture 200 or 300 to create the virtual view images 1006 and 1008 by simulating rays from each of the user's eye viewpoints to the curved surface 706. The point where each ray crosses the image plane of each virtual view images 1006 and 1008 is the location of that point within the corresponding virtual view image 1006 and 1008.

Not only does this approach provide a wide-angle view to the user 710, this also helps to avoid the creation of hole artifacts. Hole artifacts can be created when image data from different viewpoints is projected to different virtual camera imaging planes. Using the described approaches, when creating the left and right virtual view images, points on the curved surface 706 are mapped to points of the virtual view images 1006 and 1008. As a result, hole artifacts are not created since information for all points in the virtual view images 1006 and 1008 can be obtained from the curved surface 706.

In some embodiments, the configuration of the eye viewpoints and the curved surface 706 can be fixed, and a mapping can be created with one or more lookup tables to save the relationships between the points on the curved surface 706 and pixels of the virtual view images 1006 and 1008. The one or more lookup tables can be pre-computed and stored, which allows use of the one or more lookup tables to quickly generate the virtual view images 1006 and 1008. By implementing this virtual view generation approach with a rendering pipeline, the algorithm may be performed with little or no latency. Once the configuration of the curved surface 706 and the settings of the electronic device 101 are fixed, the algorithm may pre-compute a static mesh and apply that static mesh when rendering for each virtual view image 1006 and 1008.

Figure 11:
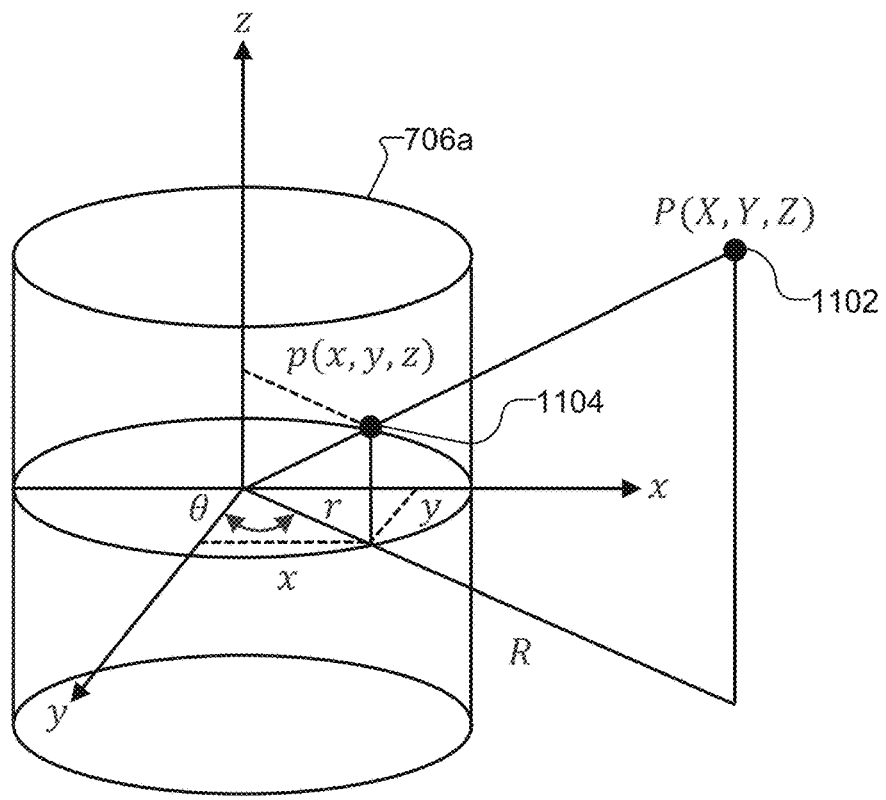
FIGS. 11 and 12 illustrate example projection techniques for projecting a 3D representation of a scene onto a curved surface in order to provide an extended field of view in accordance with this disclosure.
Figure 12:
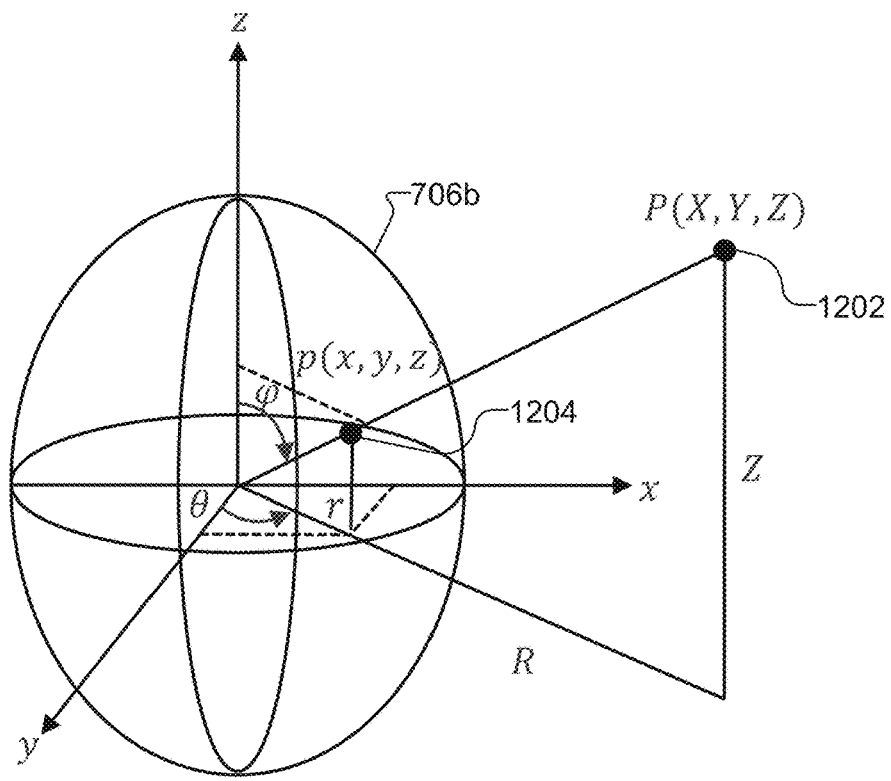

Note that the projections of points in a 3D scene onto a curved surface 706 to create a new geometry may occur in any suitable manner, which depends at least partially on the shape of the curved surface 706. For example, FIGS. 11 and 12 illustrate example projection techniques for projecting a 3D representation of a scene onto a curved surface in order to provide an extended field of view in accordance with this disclosure. More specifically, FIGS. 11 and 12 illustrate examples of how points within a 3D scene can be projected onto cylindrical and spherical curved surfaces 706a-706b as part of the processes described above.

As shown in FIG. 11, a point 1102 represents a point within a 3D scene and is represented as P(X, Y, Z), where X, Y, and Z represent coordinates of the point P within a 3D space defined using three orthogonal axes. The point 1102 is being projected onto a cylindrical surface 706a as a projected point 1104 represented as p(x, y, z), where x, y, and z represent coordinates of the projected point p within the 3D space defined using the three orthogonal axes. Using cylindrical coordinates, the positions of the point 1102 and the projected point 1104 can also be respectively expressed as P(R, θ, Z) and p(r, θ, z), where R and r respectively represent the radius from the origin of the orthogonal axes to the points 1102 and 1104, θ represents the angle of both points 1102 and 1104 relative to the y axis, and Z and z respectively represent the heights of the points 1102 and 1104 along the z axis.

To project the point 1102 onto the cylindrical surface 706a as the projected point 1104, the following calculations may be performed.

$$\frac{r}{R} = \frac{z}{Z} \quad (3)$$

$$r = \frac{z}{Z}R \quad (4)$$

$$R = \sqrt{X^2 + Y^2} \quad (5)$$

$$\tan\theta = \frac{X}{Y} \quad (6)$$

$$\theta = \tan^{-1}\frac{X}{Y} \quad (7)$$

$$\begin{cases} x = r\sin\theta \\ y = r\cos\theta \\ z = \frac{rZ}{R} \end{cases} \quad (8)$$

As shown in FIG. 12, a point 1202 represents a point within a 3D scene and is represented as P(X, Y, Z). The point 1202 is being projected onto a spherical surface 706b as a projected point 1204 represented as p(x, y, z). Using spherical coordinates, the positions of the point 1202 and the projected point 1204 can also be respectively expressed as P(R, θ, φ) and p(r, θ, φ), where R and r respectively represent the radius from the origin of the orthogonal axes to the points 1202 and 1204, θ represents the angle of both points 1202 and 1204 relative to the y axis, and φ represents the angle of both points 1202 and 1204 relative to the z axis.

To project the point 1202 onto the spherical surface 706b as the projected point 1204, the following calculations may be performed.

$$r = \frac{z}{Z}R \quad (9)$$

$$R = \sqrt{X^2 + Y^2} \quad (10)$$

$$\tan\theta = \frac{X}{Y} \quad (11)$$

$$\theta = \tan^{-1}\frac{X}{Y} \quad (12)$$

$$\tan\varphi = \frac{R}{Z} \quad (13)$$

$$\varphi = \tan^{-1}\frac{R}{Z} \quad (14)$$

$$\begin{cases} x = r\sin\theta \\ y = r\cos\theta \\ z = r\cos\varphi \end{cases} \quad (15)$$

Although FIGS. 7 through 10 illustrate one example of a projection of a 3D representation of a scene onto a curved surface in order to provide an extended field of view, various changes may be made to FIGS. 7 through 10. For example, the object 702, curved surface 706, depth map 800, projected depth map 900, and virtual view images 1006 and 1008 shown in FIGS. 7 through 10 are examples only and will vary widely based on the contents of the actual scene being imaged and the curved surface selected for use. Although FIGS. 11 and 12 illustrate examples of projection techniques for projecting a 3D representation of a scene onto a curved surface in order to provide an extended field of view, various changes may be made to FIGS. 11 and 12. For instance, the use of cylindrical and spherical surfaces is for illustration only, and any other suitable surface configured to provide an extended field of view may be used. The specific computations used to project points from a 3D scene onto the surface will therefore vary depending on the specific surface selected for use but can be easily derived based on the specific surface selected for use.

It should be noted that the functions shown in or described with respect to FIGS. 2 through 12 can be implemented in an electronic device 101, 102, 104, server 106, or other device(s) in any suitable manner. For example, in some embodiments, at least some of the functions shown in or described with respect to FIGS. 2 through 12 can be implemented or supported using one or more software applications or other software instructions that are executed by the processor 120 of the electronic device 101, 102, 104, server 106, or other device(s). In other embodiments, at least some of the functions shown in or described with respect to FIGS. 2 through 12 can be implemented or supported using dedicated hardware components. In general, the functions shown in or described with respect to FIGS. 2 through 12 can be performed using any suitable hardware or any suitable combination of hardware and software/firmware instructions. Also, the functions shown in or described with respect to FIGS. 2 through 12 can be performed by a single device or by multiple devices.

Figure 13:
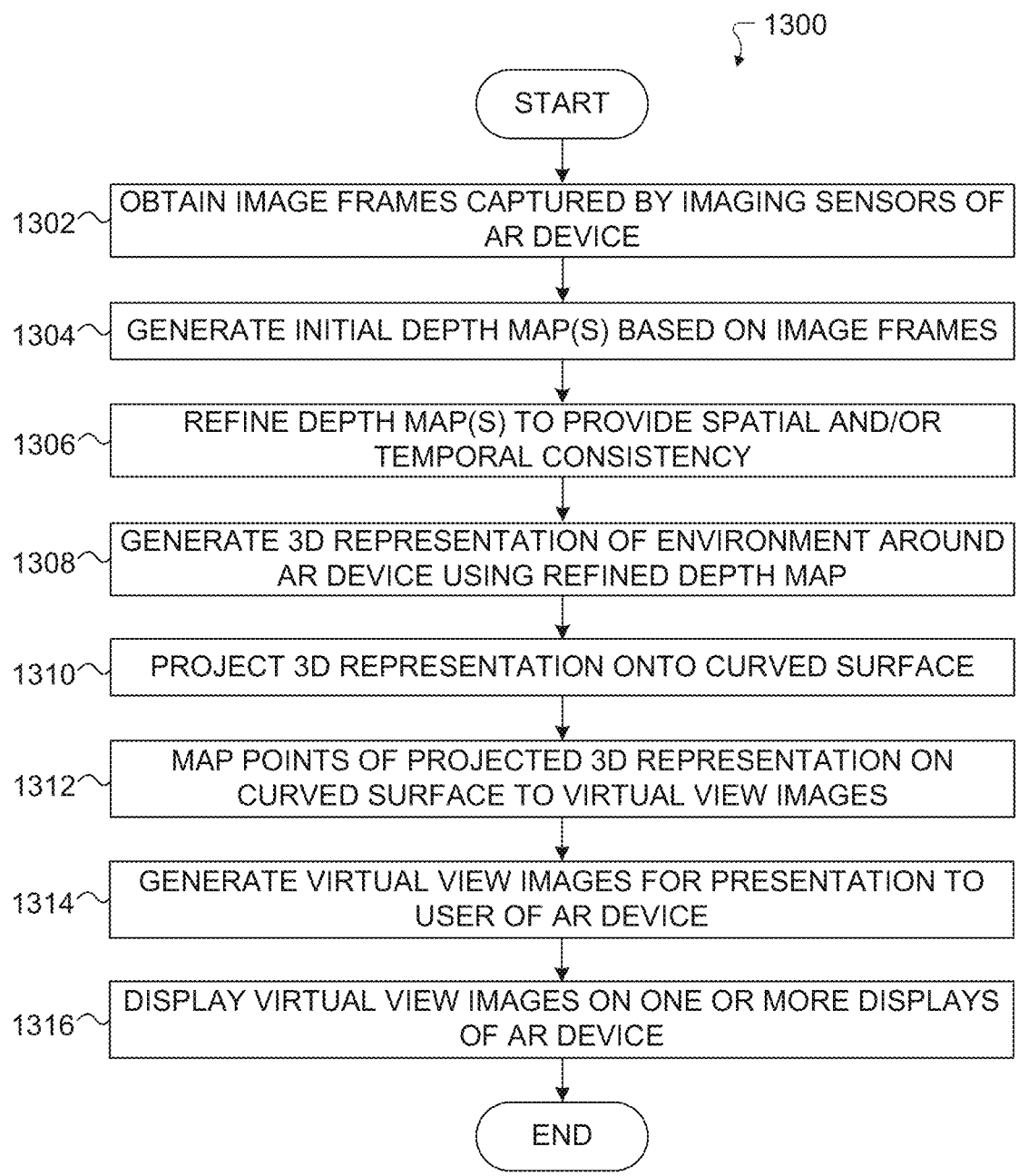
FIG. 13 illustrates an example method for generating and rendering extended-view geometries in VST AR systems in accordance with this disclosure.

FIG. 13 illustrates an example method 1300 for generating and rendering extended-view geometries in VST AR systems in accordance with this disclosure. For ease of explanation, the method 1300 is described as being performed by the electronic device 101 in the network configuration 100 of FIG. 1, where the electronic device 101 implements the architecture 200 of FIG. 2 or the architecture 300 of FIG. 3. However, the method 1300 may be performed using any other suitable device(s) and architecture(s) and in any other suitable system(s).

As shown in FIG. 13, image frames captured using multiple imaging sensors are obtained at step 1302. This may include, for example, the processor 120 of the electronic device 101 or other AR device performing the data capture operations 202 to obtain image frames 302, 304 that were captured using multiple see-through cameras 502 and 504 or other imaging sensors 180 of the electronic device 101 or other AR device. The image frames 302, 304 may optionally be pre-processed, such as by performing un-distortion and rectification operations 306-312.

At least one initial depth map is generated based on the image frames at step 1304. This may include, for example, the processor 120 of the electronic device 101 or other AR device performing the geometry reconstruction operations 206 to generate an initial depth map for each stereo pair of captured image frames 302, 304. In some embodiments, each initial depth map is generated by providing the image frames 302, 304 (and optionally at least one estimated pose associated with the image frames 302, 304 as determined using the pose tracking operations 204) to a trained machine learning model 320. The trained machine learning model 320 can be configured to generate the initial depth map based on its inputs.

At least one initial depth map can be refined to provide spatial consistency, temporal consistency, or both at step 1306. This may include, for example, the processor 120 of the electronic device 101 or other AR device performing the geometry computation operations 208 to generate and apply a spatial depth filter, a temporal depth filter, or both to depth values contained in an initial depth map. As a particular example, this may include the processor 120 of the electronic device 101 or other AR device performing the spatial consistency processing operation 330 in order to filter depth values that appear inconsistent from a spatial perspective, such as when depth values in the initial depth map are used to produce disparity values and the disparity values are used to predict feature values associated with an image frame that do not match the actual feature values associated with that image frame (at least to within a threshold amount or percentage). As another particular example, this may include the processor 120 of the electronic device 101 or other AR device performing the temporal consistency processing operation 332 in order to filter depth values that appear inconsistent from a temporal perspective, such as when depth values in a sequence of depth maps are not consistently identifying depths of common points in image frames from the same imaging sensor 180 (at least to within a threshold amount or percentage). In other cases, the initial depth map may be refined by the trained machine learning model 320 itself during generation of the depth map.

A 3D representation of an environment around the AR device is generated using the at least one refined depth map at step 1308. This may include, for example, the processor 120 of the electronic device 101 or other AR device performing the geometry computation operations 208 to generate a 3D point cloud of the scene around the electronic device 101 or other AR device as captured in the image frames 302, 304. The 3D representation of the environment is projected onto a curved surface at step 1310. This may include, for example, the processor 120 of the electronic device 101 or other AR device performing the geometry computation operations 208 to project points from the 3D point cloud of the scene onto a curved surface 706 designed to provide an extended or enhanced field of view, such as a portion of a cylindrical, spherical, or conical surface. As noted above, the specific calculations used to perform the projection can vary based on the specific curved surface 706 being used, such as depending on whether a cylindrical or spherical curved surface 706a or 706b is used.

Points of the projected 3D representation are mapped from the curved surface to multiple virtual image views at step 1312. This may include, for example, the processor 120 of the electronic device 101 or other AR device performing the geometry rendering operations 210 to project a mesh of points associated with the projection on the curved surface 706 into corresponding points of the virtual view images 1006 and 1008. In some cases, this can involve projecting the mesh of points onto the image planes associated with the see-through cameras 502 and 504 or other imaging sensors 180 in order to identify colors or other texture-related information from the image frames 302, 304.

Virtual view images are rendered for presentation to a user of the AR device at step 1314. This may include, for example, the processor 120 of the electronic device 101 or other AR device performing the geometry rendering operations 210 to generate the virtual view images 1006 and 1008. The virtual view images are displayed on one or more displays of the AR device at step 1316. This may include, for example, the processor 120 of the electronic device 101 or other AR device initiating display of the virtual view images 1006 and 1008 on the display(s) 160 of the electronic device 101 or other AR device.

Although FIG. 13 illustrates one example of a method 1300 for generating and rendering extended-view geometries in VST AR systems, various changes may be made to FIG. 13. For example, while shown as a series of steps, various steps in FIG. 13 may overlap, occur in parallel, occur in a different order, or occur any number of times. As a particular example, some or all steps of the method 1300 may be repeated to generate sequences of virtual view images 1006 and 1008 that are presented on the display(s) 160 of the electronic device 101 or other AR device.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   obtaining multiple see-through image frames of an environment around an augmented reality (AR) device using multiple imaging sensors of the AR device;
   generating a depth map based on the see-through image frames;
   generating a three-dimensional (3D) representation of the environment based on the depth map;
   projecting the 3D representation onto a curved surface;
   mapping points of the projected 3D representation to multiple virtual view images; and
   presenting the virtual view images on one or more displays of the AR device.

2. The method of claim 1, wherein generating the depth map comprises:
   generating an initial depth map based on the see-through image frames;
   identifying first image features associated with a first of the see-through image frames captured using a first of the imaging sensors;
   identifying second image features associated with a second of the see-through image frames captured using a second of the imaging sensors;
   generating predicted second image features associated with the second see-through image frame based on the first image features and relative positions of the first and second imaging sensors;
   generating a confidence map associated with the initial depth map based on differences between the second image features and the predicted second image features; and
   refining the initial depth map based on the confidence map to generate a refined depth map.

3. The method of claim 2, wherein generating the initial depth map comprises providing the see-through image frames as inputs to a trained machine learning model, the trained machine learning model configured to generate the initial depth map using the inputs.

4. The method of claim 1, wherein generating the depth map comprises:
   identifying first features associated with a sequence of see-through image frames;
   identifying second features associated with a sequence of initial depth maps, each initial depth map associated with one of the see-through image frames; and
   performing image-guided depth filtering and refinement using the first and second features to generate a refined depth map, the image-guided depth filtering and refinement comprising weight-based depth filtering using weights that are based on the first and second features associated with a current one of the see-through image frames and one or more neighboring ones of the see-through image frames.

5. The method of claim 1, wherein generating the depth map comprises:
- generating an initial depth map using a trained machine learning model; and
- modifying the initial depth map to provide both spatial consistency and temporal consistency in order to generate a refined depth map, the spatial consistency associated with depth consistencies between different ones of the see-through image frames captured at a common time, the temporal consistency associated with depth consistencies between different ones of the see-through image frames captured at different times.

6. The method of claim 1, wherein:
- a resolution of the depth map is lower than a resolution of the see-through image frames; and
- projecting the 3D representation to the curved surface comprises:
  - increasing the resolution of the depth map to generate a higher-resolution depth map;
  - verifying depths contained in the higher-resolution depth map; and
  - projecting the 3D representation of the environment to the curved surface using verified depths contained in the higher-resolution depth map.

7. The method of claim 1, wherein the curved surface comprises a portion of a cylindrical, spherical, or conical surface.

8. An augmented reality (AR) device comprising:
- imaging sensors configured to capture multiple see-through image frames of an environment around the AR device;
- one or more displays; and
- at least one processing device configured to:
  - generate a depth map based on the see-through image frames;
  - generate a three-dimensional (3D) representation of the environment based on the depth map;
  - project the 3D representation onto a curved surface;
  - map points of the projected 3D representation to multiple virtual view images; and
  - initiate presentation of the virtual view images on the one or more displays.

9. The AR device of claim 8, wherein, to generate the depth map, the at least one processing device is configured to:
- generate an initial depth map based on the see-through image frames;
- identify first image features associated with a first of the see-through image frames captured using a first of the imaging sensors;
- identify second image features associated with a second of the see-through image frames captured using a second of the imaging sensors;
- generate predicted second image features associated with the second see-through image frame based on the first image features and relative positions of the first and second imaging sensors;
- generate a confidence map associated with the initial depth map based on differences between the second image features and the predicted second image features; and
- refine the initial depth map based on the confidence map to generate a refined depth map.

10. The AR device of claim 9, wherein, to generate the initial depth map, the at least one processing device is configured to provide the see-through image frames as inputs to a trained machine learning model, the trained machine learning model configured to generate the initial depth map using the inputs.

11. The AR device of claim 8, wherein, to generate the depth map, the at least one processing device is configured to:
- identify first features associated with a sequence of see-through image frames;
- identify second features associated with a sequence of initial depth maps, each initial depth map associated with one of the see-through image frames; and
- perform image-guided depth filtering and refinement using the first and second features to generate a refined depth map; and
- wherein, to perform the image-guided depth filtering and refinement, the at least one processing device is configured to perform weight-based depth filtering using weights that are based on the first and second features associated with a current one of the see-through image frames and one or more neighboring ones of the see-through image frames.

12. The AR device of claim 8, wherein, to generate the depth map, the at least one processing device is configured to:
- generate an initial depth map using a trained machine learning model; and
- modify the initial depth map to provide both spatial consistency and temporal consistency in order to generate a refined depth map, the spatial consistency associated with depth consistencies between different ones of the see-through image frames captured at a common time, the temporal consistency associated with depth consistencies between different ones of the see-through image frames captured at different times.

13. The AR device of claim 8, wherein:
- a resolution of the depth map is lower than a resolution of the see-through image frames; and
- to project the 3D representation to the curved surface, the at least one processing device is configured to:
  - increase the resolution of the depth map to generate a higher-resolution depth map;
  - verify depths contained in the higher-resolution depth map; and
  - project the 3D representation of the environment to the curved surface using verified depths contained in the higher-resolution depth map.

14. The AR device of claim 8, wherein the curved surface comprises a portion of a cylindrical, spherical, or conical surface.

15. A non-transitory machine readable medium containing instructions that when executed cause at least one processor of an augmented reality (AR) device to:
- obtain multiple see-through image frames of an environment around the AR device using multiple imaging sensors of the AR device;
- generate a depth map based on the see-through image frames;
- generate a three-dimensional (3D) representation of the environment based on the depth map;
- project the 3D representation onto a curved surface;
- map points of the projected 3D representation to multiple virtual view images; and
- initiate presentation of the virtual view images on one or more displays of the AR device.

16. The non-transitory machine readable medium of claim 15, wherein the instructions that when executed cause the at least one processor to generate the depth map comprise:

instructions that when executed cause the at least one processor to:
generate an initial depth map based on the see-through image frames;
identify first image features associated with a first of the see-through image frames captured using a first of the imaging sensors;
identify second image features associated with a second of the see-through image frames captured using a second of the imaging sensors;
generate predicted second image features associated with the second see-through image frame based on the first image features and relative positions of the first and second imaging sensors;
generate a confidence map associated with the initial depth map based on differences between the second image features and the predicted second image features; and
refine the initial depth map based on the confidence map to generate a refined depth map.

17. The non-transitory machine readable medium of claim 16, wherein the instructions that when executed cause the at least one processor to generate the initial depth map comprise:
instructions that when executed cause the at least one processor to provide the see-through image frames as inputs to a trained machine learning model, the trained machine learning model configured to generate the initial depth map using the inputs.

18. The non-transitory machine readable medium of claim 15, wherein the instructions that when executed cause the at least one processor to generate the depth map comprise:
instructions that when executed cause the at least one processor to:
identify first features associated with a sequence of see-through image frames;
identify second features associated with a sequence of initial depth maps, each initial depth map associated with one of the see-through image frames; and
perform image-guided depth filtering and refinement using the first and second features to generate a refined depth map; and wherein the instructions that when executed cause the at least one processor to perform the image-guided depth filtering and refinement comprise:
instructions that when executed cause the at least one processor to perform weight-based depth filtering using weights that are based on the first and second features associated with a current one of the see-through image frames and one or more neighboring ones of the see-through image frames.

19. The non-transitory machine readable medium of claim 15, wherein the instructions that when executed cause the at least one processor to generate the depth map comprise:
instructions that when executed cause the at least one processor to:
generate an initial depth map using a trained machine learning model; and
modify the initial depth map to provide both spatial consistency and temporal consistency in order to generate a refined depth map, the spatial consistency associated with depth consistencies between different ones of the see-through image frames captured at a common time, the temporal consistency associated with depth consistencies between different ones of the see-through image frames captured at different times.

20. The non-transitory machine readable medium of claim 15, wherein:
a resolution of the depth map is lower than a resolution of the see-through image frames; and
the instructions that when executed cause the at least one processor to project the 3D representation to the curved surface comprise instructions that when executed cause the at least one processor to:
increase the resolution of the depth map to generate a higher-resolution depth map;
verify depths contained in the higher-resolution depth map; and
project the 3D representation of the environment to the curved surface using verified depths contained in the higher-resolution depth map.

* * * * *